(12) United States Patent
Almgren et al.

(10) Patent No.: US 11,233,657 B2
(45) Date of Patent: Jan. 25, 2022

(54) METHOD AND SYSTEM FOR REGISTERING DIGITAL DOCUMENTS

(71) Applicant: ENIGIO TIME AB, Stockholm (SE)

(72) Inventors: Hans Almgren, Taby (SE); Lars Hansén, Stockholm (SE)

(73) Assignee: ENIGIO TIME AB, Stockholm (SE)

( * ) Notice: Subject to any disclaimer, the term of this patent is extended or adjusted under 35 U.S.C. 154(b) by 96 days.

(21) Appl. No.: 16/608,974

(22) PCT Filed: May 3, 2018

(86) PCT No.: PCT/SE2018/050459
§ 371 (c)(1),
(2) Date: Oct. 28, 2019

(87) PCT Pub. No.: WO2018/203817
PCT Pub. Date: Nov. 8, 2018

(65) Prior Publication Data
US 2020/0186361 A1    Jun. 11, 2020

(30) Foreign Application Priority Data
May 3, 2017  (SE) .................................. 1750538-9

(51) Int. Cl.
*H04L 9/32*       (2006.01)
*G06F 21/64*      (2013.01)
(Continued)

(52) U.S. Cl.
CPC .......... *H04L 9/3247* (2013.01); *G06F 21/645* (2013.01); *H04L 9/0825* (2013.01); *H04L 9/30* (2013.01); *H04L 9/3242* (2013.01)

(58) Field of Classification Search
CPC ....... H04L 9/3247; H04L 9/0825; H04L 9/30; H04L 9/3242; H04L 2209/38;
(Continued)

(56) References Cited

U.S. PATENT DOCUMENTS

| 10,419,225 | B2 * | 9/2019 | Deery | H04L 9/3247 |
| 2004/0025022 | A1 * | 2/2004 | Yach | H04L 9/3236 |
| | | | | 713/176 |

(Continued)

FOREIGN PATENT DOCUMENTS

| SE | 1350947 A1 | 2/2015 |
| WO | 0141354 A2 | 6/2001 |
| WO | 2015020600 A1 | 2/2015 |

OTHER PUBLICATIONS

International Search Report and Written Opinion from corresponding Application No. PCT/EP2018/050459 dated Sep. 10, 2018, 9 pages.

*Primary Examiner* — Cheng-Feng Huang
(74) *Attorney, Agent, or Firm* — Tucker Ellis LLP

(57) ABSTRACT

Method for registering an electronically stored digital document (A), comprising the steps of a) providing to an owning party a digital document and a private ownership key, which private ownership key is a private key in an asymmetric cryptographic key pair also comprising a corresponding public ownership key; b) calculating a digital document hash value based upon the document (A); c) the owning party using the private ownership key to calculate a digital document signature of the document (A); d) digitally storing in an electronic digital document register not the document (A), but the document signature as well as the public ownership key and the document hash value. The invention also relates to a system.

21 Claims, 23 Drawing Sheets

(51) Int. Cl.
*H04L 9/08* (2006.01)
*H04L 9/30* (2006.01)

(58) Field of Classification Search
CPC ... H04L 9/3236; H04L 9/3297; G06F 21/645; G06F 21/64
See application file for complete search history.

(56) References Cited

U.S. PATENT DOCUMENTS

| | | | |
|---|---|---|---|
| 2004/0054906 A1 | 3/2004 | Carro | |
| 2006/0075245 A1* | 4/2006 | Meier | G06F 21/64 713/176 |
| 2008/0195868 A1* | 8/2008 | Asokan | G06F 21/64 713/176 |
| 2008/0301457 A1* | 12/2008 | Uesugi | H04L 9/3263 713/178 |
| 2009/0019549 A1* | 1/2009 | Reid | H04L 9/088 726/27 |
| 2011/0126022 A1 | 5/2011 | Sieberer | |
| 2014/0019761 A1* | 1/2014 | Shapiro | H04L 9/3247 713/176 |
| 2016/0188907 A1 | 6/2016 | Almgren | |
| 2016/0300234 A1* | 10/2016 | Moss-Pultz | H04L 9/3263 |
| 2016/0328713 A1* | 11/2016 | Ebrahimi | H04L 9/14 |
| 2017/0063553 A1* | 3/2017 | Saxena | H04L 9/3236 |
| 2017/0083724 A1* | 3/2017 | Chhabra | G06F 12/1408 |
| 2017/0126702 A1* | 5/2017 | Krishnamurthy | H04L 63/123 |
| 2017/0272253 A1* | 9/2017 | Lavender | H04L 9/14 |

\* cited by examiner

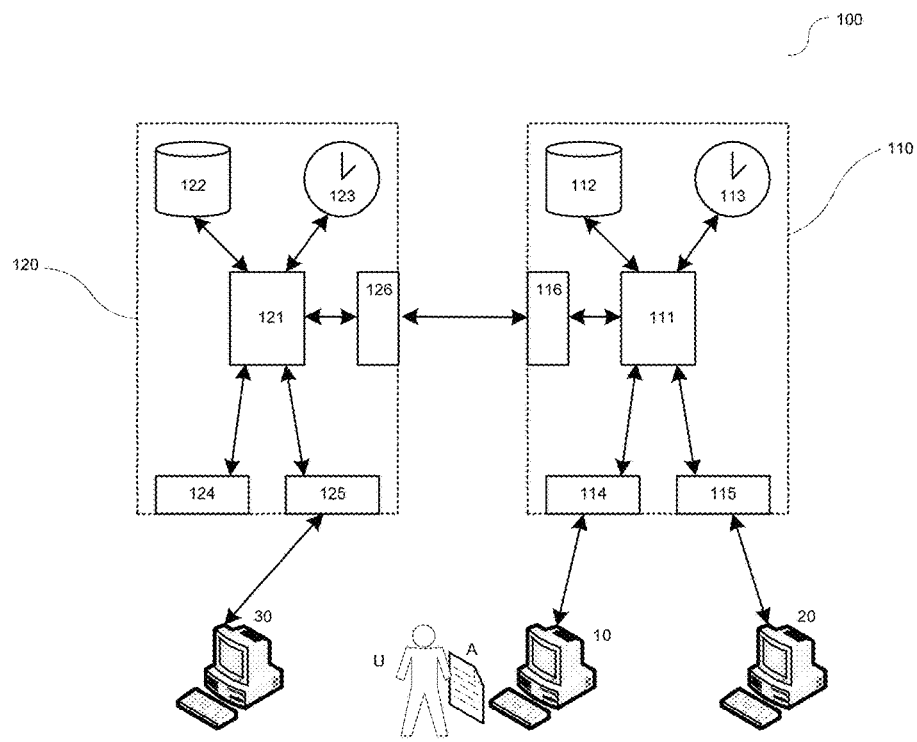

Fig. 2B

```
##########################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

##########################################################################

Content:
  Amount: 10000
  Currency: SEK
  Final date: 2019-01-05
  Debtor: Kalle Anka 891214-1234
  Signature BankID: 0x9387348973480734807348073410
#-------------------------------------------------------------------------
Seal:
  Ledger key: 023da08ec9c657f982e5cb65599961c932f6f9b8ddcb984f118bcf3a092a65b24c
  Owner key:  02b9fbe03db3e1e057538bd4b03c34ab3f419336e2a97ca5c356ad4f3feb266dbb
  Version key: d4d66b3d58636e2d49f2ddb64869bf0672dd6952456da4f632beb098d86dc72f
  Timestamp: 2017-04-12 20:38:55 UTC
  Url: http://localhost:8080/trace/01c91cf9
  Ledger signature: "381yXYtzj219Fk2dc8rQxhZNbtDB8Svi3d3zbibUCUS8vrQp\
                     dBYEKWcuCQNAScNWvNSD2nQnohAJaFvkvt1Qnnru3KfoDVdk"
#-------------------------------------------------------------------------
Updates:

- Content:
      Text: this is an amendment
    Version key: 2ad87f68a0fd9307    e46bd032cf246e76e877dc5b11dd98c42b8f640a1826e8a9
    Timestamp: 2017-04-12 20:39:27 UTC
    Ledger signature: "381yXZRUqNEEo4ur38aWWHRexaxxHuX1t7Tafq3jPSV7xEyV\
                       4shhgU9Vrs6LnSj8dKMKXuqiYjojdXh2DVRcCewP3DbesfyG"
```

Contents to hash

Fig. 2C

```
###########################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

###########################################################################

Content:
  Amount: 10000
  Currency: SEK
  Final date: 2019-01-05
  Debtor: Kalle Anka 891214-1234
  Signature BankID: 0x9387348973480734807341O
#-------------------------------------------------------------------------
Seal:
  Ledger key: 023da08ec9c657f982e5cb65599961c932f6f9b8ddcb984f118bcf3a092a65b24c
  Owner key:  02b9fbe03db3e1e057538bd4b03c34ab3f419336e2a97ca5c356ad4f3feb266dbb
  Version key: d4d66b3d58636e2d49f2ddb64869bf0672dd6952456da4f632beb098d86dc72f
  Timestamp: 2017-04-12 20:38:55 UTC
  Url: http://localhost:8080/trace/01c91cf9
  Ledger signature: "381yXYtzj219Fk2dc8rQxhZNbtDB8Svi3d3zbibUCUS8vrQp\
                    dBYEXWcuCQNAScNWvNSD2nQnohAJaFvkvt1Qnnru3KfoDVdk"
#-------------------------------------------------------------------------
Updates:

- Content:
      Text: this is an amendment
    Version key: 2ad87f68a0fd9307    e46bd032cf246e76e877dc5b11dd98c42b8f640a1826e8a9
    Timestamp: 2017-04-12 20:39:27 UTC
    Ledger signature: "381yXZRUqNEEo4ur38aWWHRexaxxHuX1t7Tafq3jPSV7xEyV\
                      4shhgU9Vrs6LnSj8dKMKXuqiYjojdXh2DVRcCewP3DbesfyG"

- Content:
      Text: owner change
    Owner key: 0363eec457ce7618446892cdff4330e6a8d27d150a48f4d88714ccc4d5f2d5aa2c
    Version key: 3264a7265d4ffc8c7e56d6c2d52272e4ddb377b9e6802a9a137896a7e1efa1f2
    Timestamp: 2017-04-12 20:39:45 UTC
    Ledger signature: "AN1rKvtSCtBKTR6NWHQ57gBTofzdJh9orrgzYg532BoLirdn\
                      njM3WwQ3NmX1QZafYMkmzND4fTkoNciWc5cWjqZNcuZfUaurZ"
```

Contents to hash / Contents to hash

Fig. 2D

```
###########################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

###########################################################################

Content:
   Amount: 10000
   Currency: SEK
   Final date: 2019-01-05
   Debtor: Kalle Anka 891214-1234
   Signature BankID: 0x9387348973480734807348073410
#-------------------------------------------------------------------------
Seal:
   Ledger key: 023da08ec9c657f982e5cb65599961c932f6f9b8ddcb984f118bcf3a092a65b24c
   Owner key:  02b9fbe03db3e1e057538bd4b03c34ab3f419336e2a97ca5c356ad4f3feb266dbb
   Version key: d4d66b3d58636e2d49f2ddb64869bf0672dd6952456da4f632beb098d86dc72f
   Timestamp: 2017-04-12 20:38:55 UTC
   Url: http://localhost:8080/trace/01c91cf9
   Ledger signature: "381yXYtzj219Fk2dc8rQxhZNbtDB8Svi3d3zbibUCUS8vrQp\
                     dBYEXWcuCQNAScNWvNSD2nQnohAJaFvkvt1Qnnru3KfoDVdk"
#-------------------------------------------------------------------------
Updates:

- Content:
       Text: this is an amendment
     Version key: 2ad87f68a0fd9307   e46bd032cf246e76e877dc5b11dd98c42b8f640a1826e8a9
     Timestamp: 2017-04-12 20:39:27 UTC
     Ledger signature: "381yXZRUqNEEo4ur38aWWHRexaxxHuX1t7Tafq3jPSV7xEyV\
                       4shhgU9Vrs6LnSj8dKMKXuqiYjojdXh2DVRcCewP3DbesfyG"

- Content:
       Text: owner change
     Owner key: 0363eec457ce7618446892cdff4330e6a8d27d150a48f4d88714ccc4d5f2d5aa2c
     Version key: 3264a7265d4ffc8c7e56d6c2d52272e4ddb377b9e6802a9a137896a7e1efa1f2
     Timestamp: 2017-04-12 20:39:45 UTC
     Ledger signature: "AN1rKvtSCtBKTR6NWHQ57gBTofzdJh9orrgzYg532BoLirdn\
                       njM3WwQ3NmX1QZafYMkmzND4fTkoNciWc5cWjqZNcuZfUaurZ"

- Content:
       Text: new owner creates an amendment
     Ledger key: 021c33963ddacd676edb88b72fd82f3afa0abe0ba90d5d9f14973cc278de54768d
     Version key: a36f3fb7aec637430338599b41744987eecf1682c32b047e56d0fd82895c1eeb
     Timestamp: 2017-04-12 20:40:12 UTC
     Ledger signature: "381yXZCDTByMiZJ2zG472T54DcMquPH3iGUcgdsFVhzZbUZU\
                       71Z277TJafcKgCEUt17Yxq5Wy9yByf4gsGn7Q9amDSwpaTdR"
```

Contents to hash

Fig. 2E

```
###################################################################

# This is a versioned Digital Original©.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

###################################################################
Content:
  Amount: 10000
  Currency: SEK
  Final date: 2019-01-05
  Debtor: Kalle Anka 891214-1234
  Signature BankID: 0x93873489734807348073410
#------------------------------------------------------------------
Seal:
  Ledger key: 023da08ec9c657f982e5cb65599961c932f6f9b8ddcb984f118bcf3a092a65b24c
  Owner key:  02b9fbe03db3e1e057538bd4b03c34ab3f419336e2a97ca5c356ad4f3feb266dbb
  Version key: d4d66b3d58636e2d49f2ddb64869bf0672dd6952456da4f632beb098d86dc72f
  Timestamp: 2017-04-12 20:38:55 UTC
  Url: http://localhost:8080/trace/01c91cf9
  Ledger signature: "381yXYtzj219Fk2dc8rQxhZNbtDB8Svi3d3zbibUCUS8vrQp\
                    dBYEXWcuCQNAScNWvNSD2nQnohAJaFvkvt1Qnnru3KfoDVdk"
#------------------------------------------------------------------
Updates:

- Content:
      Text: this is an amendment
    Version key: 2ad87f68a0fd9307    e46bd032cf246e76e877dc5b11dd98c42b8f640a1826e8a9
    Timestamp: 2017-04-12 20:39:27 UTC
    Ledger signature: "381yXZRUqNEEo4ur38aWWHRexaxxHuX1t7Tafq3jPSV7xEyV\
                      4shhgU9Vrs6LnSj8dKMKXuqiYjojdXh2DVRcCewP3DbesfyG"

- Content:
      Text: owner change
    Owner key:  0363eec457ce7618446892cdff4330e6a8d27d150a48f4d88714ccc4d5f2d5aa2c
    Version key: 3264a7265d4ffc8c7e56d6c2d52272e4ddb377b9e6802a9a137896a7e1efa1f2
    Timestamp: 2017-04-12 20:39:45 UTC
    Ledger signature: "AN1rKvtSCtBKTR6NWHQ57gBTofzdJh9orrgzYg532BoLirdn\
                      njM3WwQ3NmX1QZafYMkmzND4fTkoNciWc5cWjqZNcuZfUaurZ"

- Content:
      Text: new owner creates an amendment
    Ledger key: 021c33963ddacd676edb88b72fd82f3afa0abe0ba90d5d9f14973cc278de54768d
    Version key: a36f3fb7aec637430338599b41744987eecf1682c32b047e56d0fd82895c1eeb
    Timestamp: 2017-04-12 20:40:12 UTC
    Ledger signature: "381yXZCDTByMi2J2zG472T54DcMquPH3iGUcgdsFVhzZbUZU\
                      71Z277TJafcKgCEUt17Yxq5Wy9yByf4gsGn7Q9amDSwpaTdR"

- Content:
      Text: new owner revokes the document
    Owner key:  0000000000000000000000000000000000000000000000000000000000000000
    Version key: 9b2272d18cf7c2e98a66e6b70fef0b35d27c1821d86a106160cc1c8edcb08bd8
    Timestamp: 2017-04-12 20:40:29 UTC
    Ledger signature: "AN1rKvtHGTaZaFrBQ4oQ5D24SZ7zzwXzbMssVaBDk5u9SokH\
                      j3YZwh2iH7kRmvTJMzMgJ9gfvCidNGyQvP3fViQ3DNgFoiE2Q"
```

Contents to hash

Fig. 3A

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 0 | 2017-04-12T20:38:46Z | f7373b58 | COC | 1 | f7373b58baf f5c56647a60 eaa1734454 72e22634ea 2b27ffa259f 6d62aa732e a | 023da08ec9 c657f982e5c b655999961c 932f6f9b8dd cb984f118bc f3a092a65b 24c | 02bcd5c361 d3ecafda2eb ea0874d37d 0e183076fb ddd34f3731 3dafcbd539f 0656 | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | , | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | 381yXZCo4n mDPMK5tKS Ef-nZaiSWmSjS eH2qkvnFKk wgDxtMfg8 DKTqZiNfb-Shifw9j7wzR eBQNAXHri mfWYJmRJL 4PZ7rskn |
| 1 | 2017-04-12T20:38:55Z | 01c91cf9 | CRE | 1 | 01c91cf9d78 c1c587163b 05a633e58f a8a73036ad 3267005dd9 f4b01915b6 49c | 02b9fbe03d b3e1e05753 8bd4b03c34 ab3f419336 e2a97ca5c3 56ad4f3feb2 66dbb | 0316b85e4e 1152ae9e8b 2e197394c1 8da0fdc24a7 df4d54ff6a8 4a621d8ce6 a03f | AN1rKvtk2G vrfKXcCjR36 8g8BWhQ6D m6BKaKe-Van3zsvh87 TC1Y4zSQ1J vZszt-zny1RAtzFp Vy8wSj6rh8x 71bs9wD93 nJf2B | , | 381yXY-tzj219Fk2dc 8rQxhZNbtD B8Svi3d3zbi bU-CUS8vrQpdB YEXWcuCQN AScNWvNSD 2nQno-hAJaFvkvt1Q nnru3KfoDV dk | AN1rKvtoSc RP5qA36bg5 rSzU5iU-AvM1ndc54 9k2Yj6Uz36 WgPKE4QM aw-bUr6MCjpFa RQhE1L5wYs VRc2xw4o7 WoVhyNSdFi 6B |

Fig. 3B

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 0 | 2017-04-12T20:38:46Z | f7373b58 | COC | 1 | f7373b58baf f5c56647a60 eaa1734454 72e22634ea 2b27ffa259f 6d62aa732e a | 023da08ec9 c657f982e5c b65599961c 932f6f9b8dd cb984f118bc f3a092a65b 24c | 02bcd5c361 d3ecafda2eb ea0874d37d 0e183076fb ddd34f3731 3dafcbd539f 0656 | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | 381yXZCo4n mDPMK5tKS Ef-nZaiSWmSjS eH2qkvnFKk wgDxtMfg8 DKTqZiNfb-Shifw9j7wzR eBQNAXHri mfWYJmRJL 4PZ7rskn |
| 1 | 2017-04-12T20:38:55Z | 01c91cf9 | CRE | 1 | 01c91cf9d78 c1c587163b 05a633e58f a8a73036ad 3267005dd9 f4b01915b6 49c | 02b9fbe03d b3e1e05753 8bd4b03c34 ab3f419336 e2a97ca5c3 56ad4f3feb2 66dbb | 0316b85e4e 1152ae9e8b 2e197394c1 8da0fdc24a7 df4d54ff6a8 4a621d8ce6 a03f | AN1rKvtk2G vrfKXcCjR36 8g8BWhQ6D m6BKaKe-Van3zsvh87 TC1Y4zSQ1J vZszt-zny1RAtzFp Vy8wSj6rh8x 71bs9wD93 njf2B | | 381yXY-tzj219Fk2dc 8rQxhZNbtD B8Svi3d3zbi bU-cUS8vrQpdB YEXWcuCQN AScNWvNSD 2nQno-hAJaFvkvt1Q nnru3KfoDV dk | AN1rKvtoSc RP5qA36bg5 rSzU5iU-AvM1ndc54 9k2Yj6Uz36 WgPKE4QM aw-bUr6MCjpFa RQhE1L5wYs VRc2xw4o7 WoVhyNSdFi 6B |

Fig. 3C

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 2 | 2017-04-12T20:39:27Z | 01c91cf9 | APP | 2 | de6855a4f3 daea2b1cb7 bd32f5c5a94 c19c9f2bb05 454e58b0de 81f1465976 91 | 02b9fbe03d b3e1e05753 8bd4b03c34 ab3f419336 e2a97ca5c3 56ad4f3feb2 66dbb | 02b09546ff ced0870034 a5674ef89af bd8db6e62a d99add1d45 7cbcc78b7e 7d90 | AN1rKvtno6 vCZTpFgyQb Qxm9Y2GSF Nim-jLXpdkGxfM kdHVVvrQM rwbUiZneu-bEU28QDP1 KSBmEi9gGb 6yTaZ8p6Ec NJu64rrp | 381yXZEijDK oucswNHf5f ZHwWJ1iq1T 5cGPTc4YM REZ-CrbGKNi55n wZsgVqMev ShaKwR5ig4 PxE9Ef4TM wuFgPHbM QPAfpoH | 381yXZRUq NEEo4ur38a WWHRexaxx HuX1t7Tafq 3jPSV7xEyV4 shhgU9Vrs6L nSj8dKMKXu qiYjojdXh2D VRc-CewP3Dbesf yG | 381yXZFzUJy z7sWWQTSS 5vkb975Shu 3DiCbi-LeNWiwNcs U6AhGcmT7 TPL3KUgPh9 3uSVNW52Y aSSETXp3nic WEdnsZqkw-Puq |

Fig. 3D

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 0 | 2017-04-12T20:38:46Z | f7373b58 | COC | 1 | f7373b58baf f5c56647a60 eaa1734454 72e22634ea 2b27ffa259f 6d62aa732e a | 023da08ec9 c657f982e5c b65599961c 932f6f9b8dd cb984f118bc f3a092a65b 24c | 02bcd5c361 d3ecafda2eb ea0874d37d 0e183076fb ddd34f3731 3dafcbd539f 0656 | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | ; | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | 381yXZCo4n mDPMK5tKS Ef-nZaiSWmSjS eH2qkvnFKk wgDxtMfg8 DKTqZiNfb-Shifw9j7wzR eBQNAXHri mfWYJmRJL 4PZ7rskn |
| 1 | 2017-04-12T20:38:55Z | 01c91cf9 | CRE | 1 | 01c91cf9d78 c1c587163b 05a633e58f a8a73036ad 3267005dd9 f4b01915b6 49c | 02b9fbe03d b3e1e05753 8bd4b03c34 ab3f419336 e2a97ca5c3 56ad4f3feb2 66dbb | 0316b85e4e 1152ae9e8b 2e197394c1 8da0fdc24a7 df4d54ff6a8 4a621d8ce6 a03f | AN1rKvtk2G vrfKXcCjR36 8g8BWhQ6D m6BKaKe-Van3zsvh87 TC1Y4zSQ1J vZszt-zny1RAtzFp Vy8wSj6rh8x 71bs9wD93 nJf2B | ; | 381yXY-tzj219Fk2dc 8rQxhZNbtD B8Svi3d3zbi bU-cUS8vrQpdB YEXWcuCQN AScNWvNSD 2nQno-hAJaFvkvt1Q nnru3KfoDV dk | AN1rKvtoSc RP5qA36bg5 rSzU5iU-AvM1ndc54 9k2Yj6Uz36 WgPKE4QM aw-bUr6MCjpFa RQhE1L5wYs VRc2xw4o7 WoVhyNSdFi 6B |

Fig. 3E

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 2 | 2017-04-12T20:39:27Z | 01c91cf9 | APP | 2 | de6856a4f3daea2b1cb7bd32f5c5a94c19c9f2bb05454e58b0de81f146597691 | 02b9fbe03db3e1e057538bd4b03c34ab3f419336e2a97ca5c356ad4f3feb266dbb | 02b09546ffced0870034a5674ef89afbd8db6e62ad99add1d457cbcc78b7e7d90 | AN1rKvtno6vCZTpFgyQbQxm9Y2GSFNim-jLXpdkGxfMkdHVVrQMrwbUiZneu-bEU28QDP1KSBmEi9gGb6yTaZ8p6EcNJu64rrp | 381yXZEijDKoucswNHf5fZHwWJ1iq1T5cGPTc4YMREZ-CrbGKNi55nwZsgVqMevShaKwR5ig4PxE9Ef4TMwuFgPHbMQPAfpoH | 381yXZRUqNEEo4ur38aWWHRexaxxHuX1t7Tafq3jPSV7xEyV4shhgU9Vrs6LnSj8dKMKXuqiYjojdXh2DVRc-CewP3DbesfyG | 381yXZFzUJyz7sWWQTSS5vkb975Shu3DiCbi-LeNWiwNcsU6AhGcmT7TPL3KUgPh93uSVNW52YaS5ETXp3nicWEdnsZqkw-Puq |
| 3 | 2017-04-12T20:39:45Z | 01c91cf9 | TRA | 3 | 95191b1b4852166c17653a1ff45e45330c937418df48ebf6ba8bb2057e1840472 | 0363eec457ce7618446892cdff4330e6a8d27d150a48f4d8871 4ccc4d5f2d5aa2c | 0290ca882a99dc0a25c6853c691395f88e917b262c9ebd7b9caf23913a69bcbf74 | AN1rKvtZ2pVNnnL1abip4g48E5m2YLwf3pAM-LSYb6cNUPEov-Rfx8nTmD5ntqalJ9231xK4ro6iWxaC9AugburgUN-QW-poSZdMB9 | 381yXZPiw1crVtBAwpB-SUVXFwYYGNmwqr4RswLZH22AnJ3tGmo1mQ5y2BdBoDVN-LYRQpkWKmWuK9Jqy5MDvGdP5Fr5vUVBcs | AN1rKvtSCtBKTR6NWHQ57gBTofzdJh9orrgzYg532BoLird-nnjM3WwQ3NmX1QZaf-YMkmzND4fTkoNciWc5cWjqZNcuZ-fUaurZ | 381yXZ36MgiP9novF9bAHLz6Dmf6rE4Mm8DPiiT-iMsaiZpGLVWnnbzjBcY6nip2JKAGs8TjkQrTqtgy2GsziC2cJ1Us7Wrxc |

Fig. 3F

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 0 | 2017-04-12T20:38:46Z | f7373b58 | COC | 1 | f7373b58baf f5c56647a60 eaa1734454 72e22634ea 2b27ffa259f 6d62aa732e a | 023da08ec9 c657f982e5c b655999961c 932f6f9b8dd cb984f118bc f3a092a65b 24c | 02bcd5c361 d3ecafda2eb ea0874d37d 0e183076fb ddd34f3731 3dafcbd539f 0656 | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | , | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | 381yXZCo4n mDPMK5tKS Ef-nZaiSWmSjS eH2qkvnFKk wgDxtMfg8 DKTqZiNfb-Shifw9j7wzR eBQNAXHri mfWYJmRjL 4PZ7rskn |
| 1 | 2017-04-12T20:38:55Z | 01c91cf9 | CRE | 1 | 01c91cf9d78 c1c587163b 05a633e58f a8a73036ad 3267005dd9 f4b01915b6 49c | 02b9fbe03d b3e1e05753 8bd4b03c34 ab3f419336 e2a97ca5c3 56ad4f3feb2 66dbb | 0316b85e4e 1152ae9e8b 2e197394c1 8da0fdc24a7 df4d54ff6a8 4a621d8ce6 a03f | AN1rKvtk2G vrfKXcCjR36 8g8BWhQ6D m6BKaKe-Van3zsvh87 TC1Y4zSQ1J vZszt-zny1RAtzFp Vy8wSj6rh8x 71bs9wD93 njf2B | , | AN1rKvtoSc tzj219Fk2dc 8rQxhZNbtD B8Svi3d3zbi bU-CUS8vrQpdB YEXWcuCQN AScNWvNSD 2nQno-hAJaFvkvt1Q nnru3KfoDV dk | AN1rKvtoSc RP5qA36bg5 rSzU5iU-AvM1ndc54 9k2Yj6Uz36 WgPKE4QM aw-bUr6MCjpFa RQhE1L5wYs VRc2xw4o7 WoVhyNSdFi 6B |

Fig. 3G

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 2 | 2017-04-12T20:39:27Z | 01c91cf9 | APP | 2 | de6856a4f3daea2b1cb7bd32f5c5a94c19c9f2bb05454e58b0de81f146597691 | 02b9fbe03db3e1e057538bd4b03c34ab3f419336e2a97ca5c356ad4f3feb266dbb | 02b09546ffced0870034a5674e89afbd8db6e62ad99add1d457cbc78b7e7d90 | AN1rkvtno6vCZTpFgyQbQxm9Y2GSFNim-jLXpdkGxfMkdHVVrQMrwbUiZneu-bEU28QDP1KSBmEi9gGb6yTaZ8p6EcNJu64rrp | 381yXZEijDKoucswNHf5fZHwWJ1iq1T5cGPTc4YMREZ-CrbGKNi55nwZsgVqMevShaKwR5ig4PxE9Ef4TMwuFgPHbMQPAfpoH | 381yXZRUqNEEo4ur38aWWHRexaxxHuX1t7Tafq3jPSV7xEyV4shhgU9Vrs6LnSj8dKMKXuqiYjojdXh2DVRc-CewP3DbesfyG | 381yXZFzUJyz7sWWQTSS5vkb975Shu3DiCbi-LeNWiwNcsU6AhGcmT7TPL3KUgPh93uSVNW52YaS5ETXp3nicWEdnsZqkw-Puq |
| 3 | 2017-04-12T20:39:45Z | 01c91cf9 | TRA | 3 | 95191b1b4852166c17653a1ff45e4530c937418df48ebf6ba8bb2057e1840472 | 0363eec457ce76184468 92cdff4330e6a8d27d150a48f4d8871 4ccc4d5f2d5aa2c | 0290ca882a99dc0a25c6853c691395f88e917b262c9ebd7b9caf23913a69bcbf74 | AN1rkvtZ2pVNnnL1abip4g48E5m2YLwf3pAM-LSYb6cNUPEov-Rfx8nTmD5ntqaI9231xK4ro6iWxaC9Augbur9UN-QW-poSZdMB9 | 381yXZPiw1crVtBAwpB-SUVXFwYYGNmwqr4RswLZH22AnJ3tGmo1mQ5y2BdBoDVN-LYRQpkWKmWuK9Jqy5MDvGdP5Fr5vUVBcs | AN1rkvtSCtBKTR6NWHQ57gBTofzdJh9orrgzYg532BoLird-nnjM3WwQ3NmX1QZaf-YMkmzND4fTkoNciWc5cWjqZNcuZ-fUaurZ | 381yXZ36MgiP9novF9bAHLz6Dmf6rE4Mm8DPiiT-iMsaiZpGLVWnnbzjBcY6nip2JKAGs8TjkQrTqtgy2GsziC2cJ1Us7Wrxc |

Fig. 3H

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 4 | 2017-04-12T20:39:52Z | f7373b58 | COT | 2 | bebcb64b0ae8582373d4e2b1f9e454103f8096a8371bd0bb6366be546a5909d6 | 021c339963ddacd676edb88b72fd82f3afa0abe0ba90d5d9f1497 3cc278de54768d | 02a7bec5d08db4ab050c34db770682b1b6bdfbf81bddb010cd2e2762de655ac868 | 381yXZ5s2ZfsgR8Y2PpW7nRsxFA8FbDGYRnCb4YfQZV55UzYvVzAhN6MrprsBuQaNAGBk9AJzcRnqL2jXf2R8qxBZ25y2Vp4 | 381yXZQHd73NZTugEP13U2BmcPAFU4TgSP3gZBaCKbuwXvxJsUprl7EDvdriDyeg6eaNfEXxD5HVtrRFtay-oUaCp4suAqsvt | 381yXZ5s2ZfsgR8Y2PpW7nRsxFA8FbDGYRnCb4YfQZV55UzYvVzAhN6MrprsBuQaNAGBk9AJzcRnqL2jXf2R8qxBZ25y2Vp4 | AN1rKvtDXoa6iadKUXmL44RC17h4UenswiobHw37mA2fnY-GVvrcEM5zLEu-tHJop21sXDDxiscA8EQ1wZ5dqariu4wzH3oaJjg |
| 5 | 2017-04-12T20:40:12Z | 01c91cf9 | APP | 4 | 5366df640faeefd9d81201a90548853c88f2c33670 1eb20ad55620317d6278c63 | 0363eec457ce76184468 92cdff4330e6a8d27d150a48f4d88714ccc4d5f2d5aa2c | 0341c527c718e36e3547 ffaf0a1da518d0e24ca8c8d8272d8cd3e5522e9bf587a | 381yX-YgRfWWefcTwj9rabAR2Lq8AbT7jgzXin3c9EFZjC1WWMdBGSVxXo5enFMrxZfdrp11ZeEFeaBLCSvVL1M8iBvgYvyJv | AN1rKvtU4w4FkgqHyRY6Hj7VMwFKQvUFkdGMsG43sFFcdrqkf49HF1bi7q178fWAgu8SPurPFM95FQTU1nUNKRACmRhrWuaed | 381yXZCDTByMi2J2zG472T54DcMguPH3iGUcgdsFVhzZbUZU71Z277TJafcKgCEUt17Yxq5Wy9yByf4gsGn7Q9amDSwpaTdR | AN1rKvtYJ48bqrmcYBdSTRCBems8vWfmoz1CMooW8Wgkt2w5Ayz-FEejL7JonUXTw7Ho878gr34zu8v2yr1Hs68xFVbzcFaJuG |

Fig. 3I

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 0 | 2017-04-12T20:38:46Z | f7373b58 | COC | 1 | f7373b58baf f5c56647a60 eaa1734454 72e22634ea 2b27ffa259f 6d62aa732e a | 023da08ec9 c657f982e5c b65599961c 932f6f9b8dd cb984f118bc f3a092a65b 24c | 02bcd5c361 d3ecafda2eb ea0874d37d 0e183076fb ddd34f3731 3dafcbd539f 0656 | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | , | 381yXYg6Ug Rap2oRVxFd JQWaVRUUf 1qDc8kTDm F5vNH5SJNe 44whjJ3BZT TQ1AFEG7G ZSc-tHD2zRwvvk 6wfwULRk-buddjCBB | 381yXZCo4n mDPMK5tKS Ef-nZaiSWmSjS eH2qkvnFKk wgDxtMfg8 DKTqZiNfb-Shifw9j7wzR eBQNAXHri mfWYJmRJL 4PZ7rskn |
| 1 | 2017-04-12T20:38:55Z | 01c91cf9 | CRE | 1 | 01c91cf9d78 c1c587163b 05a633e58f a8a73036ad 3267005dd9 f4b01915b6 49c | 02b9fbe03d b3e1e05753 8bd4b03c34 ab3f419336 e2a97ca5c3 56ad4f3feb2 66dbb | 0316b85e4e 1152ae9e8b 2e197394c1 8da0fdc24a7 df4d54ff6a8 4a621d8ce6 a03f | AN1rKvtk2G vrfKXcCjR36 8g8BWhQ6D m6BKaKe-Van3zsvh87 TC1Y4zSQ1J vZszt-zny1RAtzFp Vy8wSj6rh8x 71bs9wD93 nJf2B | , | 381yXY-tzj219Fk2dc 8rQxhZNbtD B8Svi3d3zbi bU-cUS8vrQpdB YEXWcuCQN AScNWvNSD 2nQno-hAJaFvkvt1Q nnru3KfoDV dk | AN1rKvtoSc RP5qA36bg5 rSzU5iU-AvM1ndc54 9k2Yj6Uz36 WgPKE4QM aw-bUr6MCjpFa RQhE1L5wYs VRc2xw4o7 WoVhyNSdFi 6B |

Fig. 3J

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 2 | 2017-04-12T20:39:27Z | 01c91cf9 | APP | 2 | de6856a4f3 daea2b1cb7 bd32f5c5a94 c19c9f2bb05 454e58b0de 81f1465976 91 | 02b9fbe03d b3e1e05753 8bd4b03c34 ab3f419336 e2a97ca5c3 56ad4f3feb2 66dbb | 02b09546ff ced0870034 a5674ef89af bd8db6e62a d99add1d45 7cbcc78b7e 7d90 | AN1rKvtno6 vCZTpFgyQb Qxm9Y2GSF Nim- jLXpdkGxfM kdHVVrQM rwbUiZneu- bEU28QDP1 KSBmEi9gGb 6yTaZ8p6Ec NJu64rrp | 381yXZEijDK oucswNHf5f ZHwWJ1iq1T 5cGPTc4YM REZ- CrbGKNi55n wZsgVqMev ShaKwR5ig4 PxE9Ef4TM wuFgPHbM QPAfpoH | 381yXZRUq NEEo4ur38a WWHRexaxx HuX1t7Tafq 3jPSV7xEyV4 shhgU9Vrs6L nSj8dKMKXu qiYjojdXh2D VRc- CewP3Dbesf yG | 381yXZFzUJy z7sWWQTSS 5vkb975Shu 3DiCbi- LeNWiwNcs U6AhGcmT7 TPL3KUgPh9 3uSVNW52Y aS5ETXp3nic WEdnsZqkw- Puq |
| 3 | 2017-04-12T20:39:45Z | 01c91cf9 | TRA | 3 | 95191b1b48 52166c1765 3a1ff45e453 0c937418df 48ebf6ba8b b2057e1840 472 | 0363eec457 ce76184468 92cdff4330e 6a8d27d150 a48f4d8871 4ccc4d5f2d5 aa2c | 0290ca882a 99dc0a25c6 853c691395f 88e917b262 c9ebd7b9caf 23913a69bc bf74 | AN1rKvtZ2p VNnnL1abip 4g48E5m2YL wf3pAM- LSYb6cNUPE ov- RfxanTmD5n tqaJ9231xK4 ro6iWxaC9A ugbur9UN- QW- poSZdMB9 | 381yXZPiw1 crVtBAwpB- SUVXFwYYG Nmwqr4Rsw LZH22AnJ3t Gmo1mQ5y 2BdBoDVN- LYRQpkWK mWuK9Jqy5 MDvGdP5Fr 5vUVBcs | AN1rKvtSCtB KTR6NWHQ 57gBTofzdJh 9orrgzYg532 BoLird- nnjM3WwQ 3NmX1QZaf- YMkmzND4f TkoNciWc5c WjqZNcuZ- fUaurZ | 381yXZ36Mg iP9novF9bA HLz6Dmf6rE 4Mm8DPiiT- iMsaiZpGLV WnnbzjBcY6 nip2JKAGs8T jkQrTqtgy2G sziC2cJ1Us7 Wrxc |

Fig. 3K

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 4 | 2017-04-12T20:39:52Z | f7373b58 | COT | 2 | bebcb64b0ae8582373d4e2b1f9e4541038096a8371bd0bb6366be546a5909d6 | 021c33963ddacd676edb88b72fd82f3afa0abe0ba90d5d9f14973cc278de54768d | 02a7bec5d08db4ab050c34db770682b1b6bdfbf81bddb010cd2e2762de655ac868 | 381yXZ5s2ZfsgR8Y2PpW7nRsxFA8FbDGYRnCb4YfQZV55UzYvVzAhN6MrprsBuQaNAGBk9AJzcRnqL2jXf2R8qxBz25y2Vp4 | 381yXZQHd73NZTugEP13U2BmcPAFU4TgSP3gZBaCKbuwXvxJsUprL7EDvdriDyeg6eaNfEXxD5HVtrRFtay-oUaCp4suA-qsvt | 381yXZ5s2ZfsgR8Y2PpW7nRsxFA8FbDGYRnCb4YfQZV55UzYvVzAhN6MrprsBuQaNAGBk9AJzcRnqL2jXf2R8qxBz25y2Vp4 | AN1rKvtDXoa6iad-KUXmL44RC17h4UenswiobHw37mA2fnY-GVvrcEM5zLEu-tHJop21sXDDxiscA8EQ1wZ5dqariu4wzH3oaJjg |
| 5 | 2017-04-12T20:40:12Z | 01c91cf9 | APP | 4 | 5366df640faeefd9d81201a9054853c88f2c336701eb20ad55620317d6278c63 | 0363eec457ce761844686892cdff4330e6a8d27d1506a484d88871 4ccc4d5f2d5aa2c | 0341c52f7c718e36e3547ffaf0a1da518d0e24ca8c8d8272d8cd3e5522e9bf587a | 381yX-YgRfWWef-cTwj9ra-bAR2Lq8AbT7jgzXin3c9EFZjC1WWMdBGSVxXo5enFMrxZfdrp11ZeEF-eaBLCSvVL1M8iBvgYvyJv | AN1rKvtU4w4FkgqHyRY6Hj7VMwFKQvUFkdGMsG43sFF-cdrqKf49HF1bi7q178fWAgu8SPur-PFM95FQTU1nUNKRAC-mRhrWuaed | 381yXZCDTByMi2J2zG472T54DcM-guPH3iGUcgdsFVhzZbUZU71Z277TJafcKgCEUt17Yxq5Wy9yByf4gsGn7Q9amDSwpaTdR | AN1rKvtYJ48bqrm-cYBdSTRCBems8vWfmoz1CMooW8Wgkt2w5AyZ-FEejL7JonUXTw7Ho878gr34zu8v2yr1Hs68xFVbzcFaJuG |

Fig. 3L

| Trans ID | Time stamp | Doc id | Trans type | Doc ver | Document hash | Owner key | Version key | Owner signature | Version signature | Ledger signature | Ledger seal |
|---|---|---|---|---|---|---|---|---|---|---|---|
| 6 | 2017-04-12T20:40:29Z | 01c91cf9 | REV | 5 | c0f10b12f9c9d0626b6e63bf0a7a67455c737eac20002021447ca50da424ba8b | 0363eec457ce7618446892cdff4330e6a8d27d150a484d88714ccc4d5f2d5aa2c | 02f218c204240e32743f87877d9cd0e1b620a8d2f497e26f1df42c715f39badfc1 | 381yXZTam-JVzF8orut-MacCb8bTTWD8z8hCBPvP9LNeR-ETDpmhk7omVAb9KNNvsXacwltU-GiTx3yhGNayBmezmLFC5GXC23TJ | 381yXYrLY-wWXv58JhZFw7tMfBe7odLaET-DoD2Su-HEQ9z9EpG3pZGYkw98MYc77FzR-sUo7dv7Ubq9Q7x1wYzE83tM81cuAvnF | AN1rKvtHGTaZaF-rBQ4oQ5D24SZ7zzwXzbMssVaBDk5u9SokHj3YZwh2iH7kRmvTJMzMgJ9gfvCId-NGyQvP3fViQ3DNg-FoiE2Q | 381yXZA4PUMQtDPzVEDr1HFVUp-sAivN32ryQfAYXGhd3Bxqi1eWHzP75nfxiSGEpTLx-uLfXn-VuJg9CfxoJrQZZiEN4C6d2v |

Fig. 8A

```
########################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

########################################################################

Content:
  Contact info: info@enigio.com
  Maintainer: Enigio Time AB
  Master site: enigio.com
#-----------------------------------------------------------------------
Seal:
  Ledger key: 023da08ec9c657f982e5cb65599961c932f6f9b8ddcb984f118bcf3a092a65b24c
  Owner key:  023da08ec9c657f982e5cb65599961c932f6f9b8ddcb984f118bcf3a092a65b24c
  Version key: 84eb25af8a18a7b42055cac35e548c7fd62601aa402ba097c77ff1711df95844
  Timestamp: 2017-04-12 20:38:46 UTC
  Url: http://localhost:8080/trace/f7373b58
  Ledger signature: "381yXYg6UgRap2oRVxFdJQWaVRUUflqDc8kTDmF5vNH5SJNe\
                    44whjJ3BZTTQ1AFEG7GZSctHD2zRwvvk6wfwULRkbuddjCBB"
```

Fig. 8B

```
################################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

################################################################################

Content:
  Contact info: info@enigio.com
  Maintainer: Enigio Time AB
  Master site: enigio.com
#-------------------------------------------------------------------------------
Seal:
  Ledger key: 023da08ec9c657f982e5cb65599961c932f6f9b8ddcb984f118bcf3a092a65b24c
  Owner key: 023da08ec9c657f982e5cb65599961c932f6f9b8ddcb984f118bcf3a092a65b24c
  Version key: 84eb25af8a18a7b42055cac35e548c7fd62601aa402ba097c77ff1711df95844
  Timestamp: 2017-04-12 20:38:46 UTC
  Url: http://localhost:8080/trace/f7373b58
  Ledger signature: "381yXYg6UgRap2oRVxFdJQWaVRUUf1qDc8kTDmF5vNH5SJNe\
                    44whjJ3BZTTQ1AFEG7GZSctHD2zRwvvk6wfwULRkbuddjCBB"

#-------------------------------------------------------------------------------
Updates:

- Content:
      Maintainer: TimeBeat AB
    Ledger key: 021c33963ddacd676edb88b72fd82f3afa0abe0ba90d5d9f14973cc278de54768d
    Owner key: 021c33963ddacd676edb88b72fd82f3afa0abe0ba90d5d9f14973cc278de54768d
    Version key: 2bcde6c4475eda909545fcf17f1c3d50e3b59420cd3128cd3c1bc596ebd46462
    Timestamp: 2017-04-12 20:39:52 UTC
    Ledger signature: "381yXZ5s2ZfsgR8Y2PpW7nRsxFA8FbDGYRnCb4YfQZV55UzY\
                      vVzAhN6MrprsBuQaNAGBk9AJzcRnqL2jXf2R8qxBz25y2Vp4
```

Fig. 9A

```
####################################################################

# This is a versioned Digital Original®.
# Nothing may be altered or removed.
# All content is in Yaml format.
# Each addition must be registered in order to be valid.
# Every holder of a document copy can access the content off-line
# as well as verify it's authenticity on-line and off-line.
# Only the holder of the current private key owns the document and
# can append or revoke this document.

####################################################################
Type: "Agreement"
Version: "0.1"
InitialPayload:
  Creator:
    Name: "Mats Stengård"
    Email: "mats@demo.se"
  Attachment:
    Hash: "5eb696b537b35d82bab0de2f96d841bc8814db45a95fd18e79647cabe648fa5e"
    Filename: "ENIGIO_SPD_EARCHIVER.pdf"
  RequiredSignatures:
  - Type: "Verification"
    Subject:
      Name: "Hans Almgren"
      Email: "hans@demo.se"
      Comment: "CTO, Enigio Time AB"
  - Type: "Signature"
    Subject:
      Name: "Mats Stengård"
      Email: "mats@demo.se"
      Comment: "COO, Enigio Time AB"
  - Type: "Signature"
    Subject:
      Name: "Göran Almgren"
      Email: "goran@demo.se"
      Comment: "CEO, Enigio Time AB"
  TechnicalDetails:
    LedgerKey: "03b9523db78c5e5387b6467bac79b7da5b168221f58d9f14b3a0edba9283894419"
    OwnerKey: "0374e2760e2a00d880952f3c70b84e3feb02e42b39639ca93725032075db91f8dc"
    VersionKey: "acd78ca2037b386eab7e041f355f24bbd551553a4ca5c971779c748e20fa370e"
    Timestamp: "2018-05-02T12:08:36.084487Z"
    Url: "https://alfa.dev.traceoriginal.com/trace/17a97841"
    LedgerSignature:
"AN1rKvtaNWYSVjFu38S9F7nVwU2oquXhFu7M4VnqJwQ8WNe8ztWtdTMiQFbExfEZbfJmSynDQW9zEcNJE
MM6q3zcyKBQwt2RF"
Amendments:
- AmendmentPayload:
    Type: "Signed"
    Body:
      Subject:
        Name: "Mats Stengård"
        Email: "mats@demo.se"
```

Fig. 9B

Timestamp: "2018-05-02T12:08:55.186964Z"
Accepted: true
TechnicalDetails:
  LedgerKey: "03b9523db78c5e5387b6467bac79b7da5b168221f58d9f14b3a0edba9283894419"
  OwnerKey: "0374e2760e2a00d880952f3c70b84e3feb02e42b39639ca93725032075db91f8dc"
  VersionKey: "66f3eeb43b521831d7aab8f75a8ae8cdb7a316715299299658438f7cceb48084"
  Timestamp: "2018-05-02T12:08:55.213997Z"
  LedgerSignature:
"AN1rKvtB355QeVsuRvNyg5nYUmkdNGLDzgNKbfLAHRBuiAfmLFno4xMqg5S9m3PRK8Jdu7ktgNMvqhpje8arJJy9uMEJgGyUM"
- AmendmentPayload:
  Type: "Verified"
  Body:
    Subject:
      Name: "Hans Almgren"
      Email: "hans@demo.se"
    Timestamp: "2018-05-02T14:55:03.228792Z"
    Accepted: true
  TechnicalDetails:
    LedgerKey: "03b9523db78c5e5387b6467bac79b7da5b168221f58d9f14b3a0edba9283894419"
    OwnerKey: "0374e2760e2a00d880952f3c70b84e3feb02e42b39639ca93725032075db91f8dc"
    VersionKey: "c9ce9ef934afb583ba3f7367d6a5fe2b7a40cab4327cacaf6d0bb1b229a51975"
    Timestamp: "2018-05-02T14:55:03.331034Z"
    LedgerSignature:
"AN1rKvtdsFdpYXwpe2JPL7wpsqSwbnnFa3Av6fYaoLXPCobo9SkWAFvbZArPF8cpF6rKzWHAkx8DifCqar53X36B8fQjbjSDV"
- AmendmentPayload:
  Type: "Signed"
  Body:
    Subject:
      Name: "Göran Almgren"
      Email: "goran@demo.se"
    Timestamp: "2018-05-02T14:57:22.333849Z"
    Accepted: true
  TechnicalDetails:
    LedgerKey: "03b9523db78c5e5387b6467bac79b7da5b168221f58d9f14b3a0edba9283894419"
    OwnerKey: "0374e2760e2a00d880952f3c70b84e3feb02e42b39639ca93725032075db91f8dc"
    VersionKey: "e8482ea99dbfd51470971cec501201dbfa431dfdbd532f37f174292d9060fd79"
    Timestamp: "2018-05-02T14:57:22.371363Z"
    LedgerSignature:
"AN1rKvtRB33tHD2EvCNgtjrK6XawQmnvK3kB6unJXjfoUNgagzzwcVhhyWe44b6qn42jQU7rSoAbwoVaM17F4PFRbBmnnPCYf"

METHOD AND SYSTEM FOR REGISTERING DIGITAL DOCUMENTS

The present invention relates to a method and a system for registering digital documents, and in particular text documents.

Increasingly, analogue information is being digitized. This pertains to many different types of information, such as visual and audio information, including images, moving images and music. One large area which is rapidly being digitized is written documents, such as literary works, notices, descriptions, agreements and so forth.

Analogue documents are traditionally authenticated using signatures, stamps, seals and similar, so as to guarantee the authenticity of the document and its contents to interested parties.

A common problem for digitally stored documents is to provide such authenticity, since digitally stored information in general may be tampered with without leaving any trace in the document as such. Digital signatures are known, in general only serves to verify that the informational contents of a particular document are correct and signed. An improvement to such conventional document signatures has been proposed in the form of a so-called Ricardian Contract, which is a plain text (human readable) digital document which is digitally signed and which carries keys relevant to the signature as a part of the document itself.

Furthermore, various proposals have been put forward to tie specific versions to digitally stored documents to the physical world, so as to make the tampering of such document even more difficult.

Examples include SE 1350947, proposing a solution in which a digital document comprises information drawn from the physical world, while a one-way function value calculated based upon the digital document is published in a physical world channel, effectively and securely tying the digital document in a particular version or revision to a particular point in time, in a way which is verifiable for third parties at a later point in time.

There have also been attempts of tying a digital document to a verifiable external information stream, such as a blockchain, such as in the form of a coloured bitcoin, published on the public bitcoin blockchain.

However, there is still a problem with such solutions, in that it is not possible to securely determine current ownership of a particular digital document. The digital document may comprise, as part of its contents, information regarding such ownership, but a separate ownership of the document as such is more difficult to handle. One may have a different digital document specifying such ownership, but this leads to complexity when owned such digital documents evolve into different versions or revisions.

Another problem with conventional solutions for managing digital documents is to determine whether or not a particular digital document is an "original" document, or whether or not the document in question is the most recent version or revision of the document in question, or if it is the document currently "in force". In the analogue (non-digital) case, these problems are solved using original letterheads, ink signatures, seals, stamps, and so forth. However, a digital document may, in general, be losslessly copied in a way where the copy is not possible, even theoretically, to distinguish from the original. For instance, in the case of bonds or other obligatory documents, a straight-forward digital approach with plaintext digital documents may not be sufficiently secure.

The present invention solves the above problems, and proposes a way of managing digital documents to achieve the above objectives. This is done in a way wherein such documents are both easily human readable and directly accessible to humans, while at the same time also being computer readable in a sufficiently secure way.

Hence, the invention relates to a method for registering an electronically stored digital document, comprising the steps of a) providing to an owning party a digital document and a private ownership key, which private ownership key is a private key in an asymmetric cryptographic key pair also comprising a corresponding public ownership key; b) calculating a digital document hash value based upon the document; c) the owning party using the private ownership key to calculate a digital document signature of the document; d) digitally storing in an electronic digital document register not the document, but the document signature as well as the public ownership key and the document hash value.

Moreover, the invention relates to a system for registering an electronically stored digital document, which system comprises a central server arranged to, upon request from the computer of a user, digitally store, in an electronic digital document register, not the document, but a digital document signature as well as a public ownership key and a digital document hash value, in that the public ownership key is a public key in an asymmetric cryptographic key pair also comprising a corresponding private ownership key, in that the hash value is calculated based upon the document, and in that the document signature is calculated based upon the hash value and using the private ownership key.

In the following, the invention will be described in detail, with reference to exemplifying embodiments of the invention and to the enclosed drawings, wherein:

FIG. 1 is an overview of a system according to the invention, arranged to perform a method according to the present invention;

FIGS. 2A-2E show the actual contents of a particular digitally stored document in versions 1, 2, 3, 4 and 5;

FIGS. 3A-3L show the contents of a document register according to the present invention after registration of the respective document versions shown in FIGS. 2A-2E;

FIGS. 8A and 8B show the actual contents of a particular digitally stored configuration document in versions 1 and 2; and FIGS. 9A and 9B shows the actual contents of a particular other digitally stored configuration document.

Figure 4:
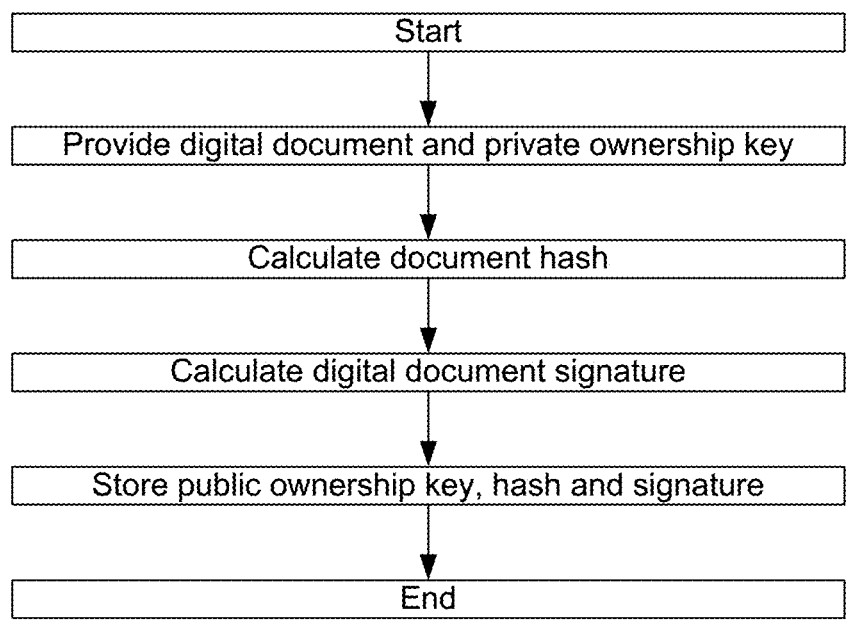
FIG. 4 is a flowchart showing a first method according to the invention.

The present invention is partly based upon cryptographic keys, and in particular asymmetric cryptographic key pairs. In general, such key pairs comprise a respective private key and a respective public key. Then, a certain piece of information which has been encrypted using one of the keys can be decrypted using the other key. Specifically, the public key can be used to decrypt a piece of information which has been encrypted using the private key.

Such encryption is typically performed on a hashed version of the information. A hash value is then first calculated using a one-way function, in other words a function the input value of which is, in practice, impossible to determine based only upon the corresponding function output value, and which is substantially one-to-one in the sense that in the practical applications described herein, two different input values will in practice always result in two different output values. Examples include many hash functions which are conventional as such, such as SHA hash functions, such as SHA-1, SHA-2 and SHA-3, as well as MD5.

Therefore, it is practically impossible to calculate the said verifiable encryption without actually having access to the private key in question. Similarly, the public key is determined in a way which makes it, in practice, impossible to calculate the value of the public key without actually knowing the value of the private key in question.

In case a particular private key has been used to encrypt a certain piece of information, using the corresponding public key to successfully decrypt the information constitutes a proof that the said private key was actually used to encrypt the piece of information in question.

Such asymmetric cryptography key pairs are well-known in the art as such, and will not be discussed in more detail herein.

Herein, keys are in general referred to as [public/private] [type] key, where [public/private] may be "public" or "private"; and [type] is the type of key pair considered, such as version, ownership or ledger key pair.

FIG. 1 illustrates a system 100 according to the present invention, which is useful for performing a method according to the invention.

The system 100 comprises at least one central server 110, in turn comprising a logic module 111, a database 112, a time unit 113, a document registration interface 114, a document verification interface 115 and a distributed register interface 116. The logic module 111 is in digital communication with the rest of the units 112, 113, 114, 115, 116, and is in general responsible for performing the method steps described herein that are performed by the central server 110, including document and other information handling, processing and communication. Therefore, the logic unit 111 preferably comprises a computer processor, a random access memory and communication means to communicate with the other units 112-116.

The database 112 is arranged to store the register described below, and in addition thereto any other relevant data, such as method state data and personal and account user data of users to the system 100.

The time unit 113 is arranged to provide a current time, such as from an internal clock or from an external time source, and may provide current time and/or time signal information to the logic module 111 according to the below.

The interfaces 114, 115, 116 will be described in detail below, but are in general digital, electronic interfaces, preferably application programming interfaces (API's), arranged for automatic machine-to-machine communication with system 100 components arranged externally in relation to the central server 110. Interfaces 114, 115, 116 may be separate interfaces or different aspects or functions of one and the same interface.

The notion "central server", as used herein, relates to a set of centralized functionality. Such functionality may be implemented as software functionality running on a stand-alone hardware server; be implemented as a distributed software functionality running in parallel as individual, communicating software applications on several servers; be implemented as a software functionality running on a virtual server, in turn running on one or several, distributed servers; or a combination of such setups. It is also possible that part of the central server functionality is implemented in hardware. Hence, the term "centralized" describes a connected functionality forming one logical unit.

A second central server 120, which may be identical (such as running an identical set of software functionality, in the same or a different state) or similar to the first central server 110, may also be part of the system 100, comprising a corresponding database 122, time unit 123, document registration interface 124, document verification interface 125 and distributed register interface 126. In this case, the central servers 110, 120 are in digital, electronic communication with each other, via the respective distributed register interfaces 116; 126. There may be also more than two such interconnected central servers 110, 120.

All communications herein may take place via the open internet, or, as the case may be, within a local area network. Furthermore, all communications that are open to third parties are preferably, when so is desired due to the nature of the communicated information, encrypted. At any rate, all communications and all data management are of electronic and digital nature.

The present invention is based upon the use of a central document register, or ledger. Here, the term "central" is to be interpreted as above in relation to the central server, in the sense that it is accessible as one connected entity. As such, the central document register may be stored in once centralized location, logically or physically, or be distributed with at least one single point of access.

Hence, such a document register is digitally and electronically stored, and comprises information at least regarding documents registered with the system 100 according to the invention and document transactions pertaining to such documents, such as additions to such documents; changes of ownership of such documents; and termination of such documents.

However, the document register does not comprise the documents themselves, and in particular not a respective payload content of such documents. This way, the document and its payload content can be kept locally, by the interested parties, and hence remain secret if so is desired. Still, the registration of the document in question in the document register of the system 100 provides security for the parties, and any interested third parties, regarding the contents of the document in question in its various versions, as well as regarding ownership to the document in question. This will be detailed in the following.

In general, the document register may be stored in the database 112 of the central server 110. It may also be stored in the database 122 of the other central server 120, and in general in a plurality of databases of such central servers. Each such central server 110, 120 may preferably store its own full copy of one and the same document register, or each central server 110, 120 may store different subsets of the document register, which subsets may be partly overlapping. Hence, the document register may be distributed across several central servers 110, 120, such as across respective central servers jointly offering document registration services to third parties or internally among each other.

According to one preferred embodiment, document register data is exchanged between central servers 110, 120 via interfaces 116, 126, preferably automatically so as to implement a predetermined synchronization scheme of the document register among the central servers 110, 120. For instance, each central server 110, 120 may be obliged to update its copy of the document register to the most recent version available on the network of central servers 110, 120, such as from peer central servers or a master central server, with a minimum time frequency, which minimum time frequency is preferably at least one time per day, preferably at least one time per hour. Alternatively, each central server 110, 120 may be obliged to update its copy of the document register to the most recent version available on the network in connection to each document register transaction involving the central server in question.

Preferably, the document register is complete in the sense that it comprises all document transactions pertaining to the documents handled by the network of central servers 110, 120 sharing the same document register in question. Hence, by consulting the document register, it is possible for a part to verify any document registered in the document register, both in its current latest version and previous versions.

The document register may also be stored with an external information storing part, as a backup or as a main point of storage for the document register. It is, however, preferred that at least one central server 110, 120 can guarantee the validity of the document register, and is a trusted party in relation to all users U of the system 100.

Such users U each use a respective general-purpose computer 10, 20, 30, such as a desktop computer, a laptop computer, a smartphone or a software function to interact with at least a respective one of the central servers 110, 120. Such interactions take part via interfaces 114, 115, 124, 125 and comprise the registering of digital documents A, additions, assignments and terminations of such documents A, as well as verifications of such documents, including information regarding versions, ownership and status.

Users U may of course be human beings. However, it is realized that a system 100 according to the present can also handle machine users, such as automatically, electronically operated stock exchange servers, brokerage servers, insurance-managing servers, or any other entity that deal with agreements or other type of electronically stored documents in an automated manner. Hence, computers 10, 20, 30 may be controlled by human users U or act automatically based upon software algorithms implemented by the computers 10, 20, 30 themselves, possibly being triggered by externally communicated triggers such as the introduction of a particular agreement between two parties, which agreement is codified in an electronic document A as described herein.

FIG. 4 illustrates a method according to the invention, for registering an electronically stored digital document A in a document register of the above discussed type.

FIG. 2A shows an exemplifying document A to be registered in the document register. The document A is in this case a simple promissory note. It is realized that the document may be any type of information, such as any financial instrument; an agreement; an artistic work; and so forth, as long as the document can be coded in a plain text format. The document as illustrated in FIG. 2A is shown in its entirety, and is formatted as a text document, in plain text. The document A may for instance be stored as a regular text file in the computer 10 of the user registering the document A.

As shown in FIG. 2A, the document comprises the following sections.

Comments, specifying relevant information to a human reader of the document. Such information may relate to the contents and purpose of the document, and also to the formatting standard followed by the document. In the example shown in FIG. 2A, the formatting is YML. This section may also comprise various metadata, as desired.

Document type specific data, in the present case information regarding a specified debt amount; a specified debt currency; a specified final date for the debt; a specified debtor, and a digital signature ("BankID") proving the identity and/or intention of the debtor. These document type specific data is also called the "payload" of the document, and corresponds to the cognitive contents (the information parts directly relevant to the interesting parties) of the document—in this case, a simple promissory note. It is noted that "BankID" is a Swedish personal authentication service.

A ledger key.
A public ownership key.
A private version key.
A timestamp.
A document identifier ("ID"), in this case as a part of a URL (Uniform Resource Locator)
A signature.

As illustrated in FIG. 4, in a first step, the method starts.

Then, the method comprises the step of providing, to a document owning party, the digital document and a private ownership key. In general, the user U registering the document is the document owner, since the party controlling the private ownership key is the document owner in the terminology used herein. Note that a machine user 10, 20, 30 may be an "owner" to the document, implying that a company or user controlling the machine user, or the automatic document registration process, is the ultimate owner of the document. Hence, that the document and the private ownership key are "provided to" to the owning party may mean that the owning party itself produces the document and/or the private ownership key, or that a third party provides such information to the owning user. It is preferred that the owning user produces, in a conventional suitable way, the private/public ownership key pair, without exposing the private ownership key to any other party in the process.

The said private ownership key is a private key in an asymmetric cryptographic key pair of the above defined type, also comprising a corresponding public ownership key. In the present system 100, the control of the private ownership key is equivalent to ownership of the corresponding registered document. In case the private ownership private key is lost, so is ownership to the document, in an irrevocable manner.

In a next step, a digital document hash value is calculated based upon the document in question. Preferably, the hash value is calculated as a hash of the document contents, preferably a part of the document not including the hash information or the document signature itself (as the hash value may also be added as a part of the document it pertains to, in plaintext format), such as the entire document preceding such hash information. In case the document does not comprise neither the hash value nor the document signature itself (such as is the case in the example show in FIG. 2A), or in case the document only comprises one of these values, the hash value may be calculated based upon a part of the document not comprising said document signature and/or hash value, such as the whole document up to but not including the signature in question. In FIGS. 2A-2E, the preferred respective part of the document contents is marked by the words "Contents to hash". In FIG. 2A, the contents to hash do not comprise the Url, since the document identifier is calculated based upon the hash value of the document.

Preferably, the hash value is calculated based at least upon the document payload. The hash value itself may be calculated according to any conventional hash function, preferably a one-way function of the above identified type, such as using a SHA function. Preferably, the resulting hash value is at least 32 bytes long. Preferably, the hash value is calculated using a predetermined hash function broadly identified and defined across the system 100, such that any central server 110, 120, and preferably also any user, with access to the document in question may calculate the hash value in question.

In particular, it is preferred that the hash value is calculated at least based upon a timestamp which is comprised in the document in question. Preferably, the timestamp is calculated in connection to the registering of the document or document version in the document register, so that the hash value, which is calculated based upon the timestamp in question, will as a result depend upon the time of registration. This is in particular preferred in case a document identity stored in the document register and/or in the document is, or is calculated based upon, the hash value of a particular document. In this case, the central server 110 may refuse to register a document with a document identity which is identical to a document which is already stored in the document register in question, and the document-registering party may then as a response wait a short time, include an updated time stamp in the document and then try again, using the hash which will then be different from the first attempt. In particular, this is the preferred case when the document identity is a short or truncated version of the hash value, preferably the hash value of the first document version, such as the first 8 bytes or characters of the hash value.

In a next step, the owning party in question uses the said private ownership key to calculate a digital document signature of the document to be registered, which calculation uses the said hash value as input value. That the private ownership key is "used to calculate" the signature means that the private ownership key is a necessary prerequisite for calculating the signature in question. Preferably, the signature function used to calculate the signature in question is sufficiently well-defined and identified across the system 100 so that any central server 110, 120, and preferably also any user, with access to the hash value in question and the said public ownership key can verify that the private ownership key in question was in fact used to calculate the signature value in question. Preferably, it is possible for any part with access to the hash value and the used signature calculation function to determine the said signature value in a deterministic value. For instance, the signature value may be calculated an elliptic function cryptography approach.

Then, in a next step, at least the following digital data is stored digitally and electronically in the document register: the said signature value, the public ownership key and the document hash value. However, the document in question is not stored in the register as such. In fact, it is preferred that neither the document itself, nor any information which may be used to restore the document in question, and in particular not the document-specific payload data (in the example shown in FIG. 2A the debtor being Kalle Anka and the amount being SEK 10000 with a final date of Jan. 5, 2019 and the Signature BankID as specified), is stored in the register, or even communicated to the central server 110, or even to any of the central servers 110, 120.

Preferably, at least the hash value, the signature value and the public ownership key are provided from the user's U computer 10 to the central server 110 via the interface 114, offering a standardized set of communication calls or methods providing the means to provide such information according to a predetermined allowable and well-defined format.

In particular, it is preferred that a digital copy of the document which is registered is held locally by the registering user U, and possibly other interested parties that the user U has agreed to share the document with. Hence, the document itself will not be available by inspection of the document register.

Preferably, the central server 110 provides a data validation step before storing the document information in the document register, and does not perform the said storing in case the data validation does not turn out in the positive. In particular, in such a data validation step, the document signature is preferably verified, using the public ownership key, in the sense that the document signature for the document or document version was actually calculated using the ownership public key. This may for instance take place by the document signature being decrypted using the public ownership key, and the result matches the corresponding hash value. The validation step may also comprise verifying the version key, as described below.

FIG. 3A shows the document register as it is constituted immediately after the registration steps above. The first line contains headers, the subsequent lines contain the data stored. The second data line ("Trans ID"=1) corresponds to the said registration step. It is noted that the information shown in FIG. 3A is conceptual, and that the actual data may be electronically stored in any suitable manner, such as in a conventional relational database.

Such a method and such a system achieves that the document in question, and any additionally stored document, can be securely verified by any user to the system 100, without the document as such needing to be distributed or disclosed to other parties than the owning party and any other interested parties to which the owning party, or any other party has granted such access. How such verification may be performed will be described below.

As a matter of fact, as will be understood from the following, the "ownership" of such a registered document, in its currently updated version, may be defined as the control of the ownership private key, and any digitally stored version of the document itself may be considered as a "copy" of an original document, the original document merely being defined as the document in question which is owned by the part controlling the ownership private key.

According to a preferred embodiment, in addition to the above mentioned information, in the document register may also be stored, as a part of the said document registration, a hash value of a first version of the document stored in the document register. Furthermore, in the document register is stored a document version number of the document. The latter is illustrated in FIG. 3A ("Doc ver" header). The first version hash value is not illustrated as a column in FIG. 3A (it is not necessary when using the version signature described below), but in case it is used, such a hash value may be calculated based upon at least the payload of the first version of the document which was stored in the document register is present. Moreover, such an original hash value, if used, may be calculated in the corresponding way as the document hash, such that the hash value of the first stored version of a particular document is identical to the original hash value of the same document version. Using such a document version and/or an original document hash provides a simple way of keeping track of various versions of the same document, which are all tied together by one and the same value for the original hash value.

According to one preferred embodiment of the present invention, each document may only be present in one single most recent version. Hence, every time an updated document version of a particular document is registered in the document register, that version supersedes all previous versions. In other words, document versions cannot preferably be forked in a tree structure. This is preferably supervised by the central server 110.

Preferably, both the document hash value and the original hash value are calculated as a respective one-way function of the above described type. Further preferably, the respective version numbers of consecutive versions of one and the same document constitute a monotonous series of values, such as starting from "1", that are each unique for one and the same document.

Hence, one and the same document may be registered multiple times in the document register, where each such registration pertains to a particular version of the document, and in particular to different successive amendments to the document in question, as described below.

Preferably, in the document register is also stored a unique transaction identifier ("Doc ID") for each such registration of a document or a document-related event. That the transaction identifier is "unique" means that it is unique across all registration posts (individual lines in FIGS. 3A-3L) in the document register. Preferably, the transaction identifier is a monotonously growing number series, such as starting from "0".

According to an additional preferred embodiment, illustrated in FIGS. 2A and 3A, for the document stored in the document register, in addition to the information mentioned above, in the document register is also stored a public version key, which public version key is a public key in an asymmetric cryptographic key pair also comprising a corresponding private version key. The version key pair is not the same as the ownership key pair, but is preferably also controlled, and preferably produced, by the user registering the document and/or document version with the document register. Preferably, the private version key is produced, in a conventional manner, after which the corresponding public version key is calculated based upon the private version key. The private version key is preferably comprised, as human-readable plain text, in the current version of the document registered in the document register, preferably in the part of the document in question used to calculated the hash value described above for the document. In FIG. 2A, the field "Version key" is the private version key; in FIG. 3A, the field "Version key" is the corresponding public version key.

In particular, a current version of the document in question which is registered in the document register is not a first version of the document. This is illustrated in FIGS. 2B, 3B, and 3C, wherein a second version is indicated ("Document version"=2, see FIG. 3C, line 13).

In particular, the second version of the document in question comprises an amendment of the document's payload. In the simple example shown in FIG. 3A, the amendment is an addition of the text "Text: this is an amendment". However, the amendment may be any change of part of the payload arranged to convey cognitively qualitative information between parties interested in the document in question, such as parties to an agreement manifested in the document, or similar. For instance, the amendment may be overriding information changing the debt amount from 10000 SEK to 5000 SEK. In fact, the amendment could be any change in the cognitive contents of the first version's payload, or any addition of said payload. Preferably, such an amendment is simply indicated by a plaintext part, such as "Text: 5000 SEK", which is presumed legible by the parties to the debt in question.

Preferably, the additional document version comprises all text contents of the previous version (preferably of all previous versions) of the document in question, preferably also the document signature comprised in the previous version if this signature is present in the document. In FIG. 2B, this is illustrated by version 2 of the document simply being the first version of the document with the additional information pertaining to the second version appended to the first version of the document in question, at the end of the first version text. Hence, preferably all ownership and version keys comprised in any previous version is preferably also comprised in a current latest version of the document in question.

It is further noted that the amendment in version 2 of the document in question does not entail a change in the public ownership key, since the owner of the document has not changed as a result of the amendment. Therefore, the document text after the heading "Seal:" does not comprise an updated ownership public key. However, in a preferred embodiment not illustrated in the Figures, the registering of each new document version comprises the determination of an updated ownership private-public key pair, and the addition of an updated public ownership key to the document version in question.

However, the second version of the document preferably comprises the updated version private key, which is preferably recalculated for each new document version. Line 1 in FIG. 3C comprises a correspondingly updated, public version key.

The second version of the document also preferably comprises a current timestamp (of the second version document), and an updated document signature. The signature is preferably calculated, based upon the current ownership public key and based upon an updated hash value, which updated hash value is calculated based upon at least the payload information of the amendment comprised in the latest document version, and preferably upon also at least the payload of the previous version (preferably all previous versions) of the document. In the example shown in FIG. 2B, the hash value is calculated based upon the entire text contents of the second version of the document from its beginning and up to the phrase "Ledger signature:".

In FIG. 3C, a first post (line) is shown, corresponding to the registration of the second version of the document. The transaction ID for the first version registered is 1 as shown in FIG. 3B, whereas the transaction ID for the second version is 2 as shown in FIG. 3C. The time stamp is updated to reflect the time stamp which is part of the document in question, which is also the case for the first version of the document. Whereas the transaction type for the first registered version is "CRE" for "create", the transaction type for the second registered version is "APP" for "append". The document version is 2 for the second version, and 1 for the first version.

As is also clear from FIGS. 3B and 3C, the content hash is different between the first and second versions, as well as the document signature ("Owner signature").

Since the ownership public key has not changed in the document between versions 1 and 2, the corresponding information in the document register (which is the same as in the document in question) has not changed either. To the contrary, the version public key has changed between versions 1 and 2, which is reflected in the "Version key" field in the document register. It is noted that the version public key is not part of the document, since the document only comprises the version private key ("Version key" in FIG. 2B).

In FIGS. 3A, 3B, and 3C, a respective "Ledger seal" value is also displayed, one for each document version (1 and 2). The ledger seal is a seal hash which is preferably a hash value calculated based upon the document register itself, preferably either the immediately previously registered post or transaction in the document register (irrespectively of which document that post or transaction related to) or the entire document register in its state immediately before the addition of the register transaction or post comprising the seal hash in question. The seal hash may be calculated based upon any suitable one-way function, such as SHA-256.

According to a preferred embodiment of the present invention, the document registration method comprises a verification step, in which the owning party, in other words the computer 10 of the user U registering the document or document version in question via the interface 114) is requested, by the central server 110, to produce a version signature of a piece of verification information using the private version key comprised in a previous version of the same document in question.

The piece of verification information may be any information which is possible to produce a signature of, using the private version key, and the authenticity of which may be verified by the central server 110 using the corresponding public version key stored in the document register for the previous document version in question. For instance, the piece of verification information may be a predetermined standard information which is used for this verification step; the document itself in its most updated or previous version; or any other well-defined piece of information.

The previous version of the document in which the version private key is comprised is preferably the preceding version of the document which directly precedes the version being verified.

Preferably, the registering of an amended version of a particular document comprises the following steps:

Firstly, the document owner creates a new version public/private keypair, as well as an amended document content, with the newly created version private key inserted in plain text in the amended document.

Secondly, the document owner creates a document register API call containing the newly created version public key, as well as a signature of the said version public key using the previous version private key, which version private key is read from the previous version of the document held by the document owner.

Thirdly, the document register verifies the said signature, as well as the document owner signature, and stores them both in the document register, along with the new version public key received from the document owner.

The storing in the document register described above is preferably not performed unless a public version key stored in the document register with respect to said previous version of the document matches the version signature in question, in the sense that the central server 110 is able to verify, using the said version public key, that the version signature in question was actually calculated using the version private key. This may imply that the central server decrypts the version signature, using the public version key, and that it compares the result with the predetermined information expected.

Hence, in order to store a new most recent version of the document, the storing user must have access to a copy of the said previous version of the document, since the version private key is only stored therein. Hence, it is not possible for a non-authorized user to hijack a document by registering a new version of it with the document register. Also, if the document itself is lost, it is not possible to restore the document by registering an additional version of the same document. Preferably, in this case the only amendment allowed by the central server 110 is a revocation of the document. Further, document version forking, which is undesired, will be more unlikely.

Figure 5:
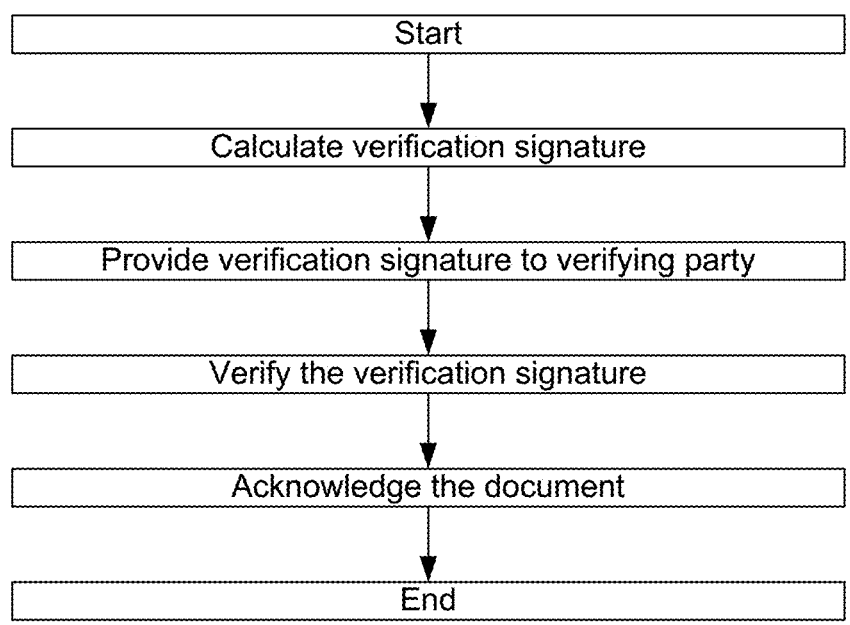
FIG. 5 is a flowchart showing a second method according to the invention.

Once a particular document, or a particular version of a particular document, has been registered in the document register, it may be verified by any interested party as being authentic, and that a party claiming to be the owner of the document or version in question is in fact the rightful owner. A verification method, which may constitute a continuation of the registration method described above, is illustrated in FIG. 5, and starts in a first step.

In a second step, the owning party in question uses the private ownership key of a registered document (that is, the private ownership key corresponding to the public ownership key which is stored in the document register and which may be specified in the document itself), to calculate a digital verification signature of a piece of digital verifying information. This verifying information may any predetermined piece of information, such as the text "I, Mr. Green, own this document, with Doc Id f7373b58 at the time Dec. 3, 2014 08:43:02"; the document itself; or any other suitable well-defined piece of information. It is preferred that the predetermined piece of information comprises a subpiece ("Mr. Green") which is specific to the owner. It is furthermore preferred that the predetermined piece of information comprises a subpiece ("Doc Id f7373b58") which is specific to the document in question. It is also preferred that the predetermined piece of information comprises a subpiece specifying the current time at the request in question ("Dec. 3, 2014 08:43:02"). This avoids replay attacks.

Then, in a next step, the owning party provides, to a verifying party, the verification signature calculated. The verifying party may be any interested party requesting the verification of the ownership of the document or document version in question. Such a request may be posed via the interface 115, and be conveyed between the verifying user and the owning user via the central server 110. However, preferably the verifying party and the owning party may perform these verification steps directly between them, preferably using a predetermined communication interface between the computers 10, 20, exchanging the information required to perform the ownership verification.

In a subsequent step, the public ownership key in question is used to verify both the verification signature and the document signature. Hence, the verification signature is verified in the sense that it is verified, using the public ownership key stored in the document register and possibly in the document as such, that the private ownership key was in fact used to calculate the verification signature. For instance, the public ownership key may be used to decrypt the verification signature, and the result may be compared to the expected piece of information. The document signature is also verified, using the same ownership public key, in the sense that the document signature stored in the document register was actually calculated using the ownership public key in the corresponding manner.

As long as the verifying party has access to the document or document version in question, both parties have all necessary information to perform these verification steps. If the verifying user does not actually have access to the document, the verifying party may request the ownership public key and the document signature from the central server 110, via interface 115. It may also be so that the central server 110 provides, via interface 115, a service to third parties to verify ownership and authenticity of a particular document identified by the third party in question, by sending the corresponding request for a verification signature to the owning party indicated by the third party in question. The document may be identified using the stored Document ID in the document register.

In a subsequent step, in case the verifications described above turn out in the positive, the document or document version is acknowledged, meaning that the party claiming to be the owner is in fact the owner, and that the document is authentic.

Hence, using such a verification method, the ownership and authenticity of a document or document version may be securely verified without having to actually communicate the actual document contents between the parties, or even between any party and the central server 110. As long as the party claiming to be the owner controls the appropriate private ownership key, such party is in fact the proper owner.

In particular, it is preferred that the document register does not comprise any information regarding the identity of the owning party. Then, the verification procedure preferably comprises an initial step in which the verifying party electronically queries the owning party regarding ownership status of the document or document version in question.

It may be so that the verifying party wishes to verify also that the party claiming to be the owner to a particular document or document version actually has access to a copy of the document or document version in question, for instance as an extra security measure. Then, the verification method comprises an additional, separate step, in which it is verified that the owning party has access to the document or document version by calculating a verification hash value based upon the document or document version, and the verifying party verifying the verification hash value which is sent electronically and digitally from the owning party to the verifying party. The hash value in question may be calculated using a predetermined hash function which is known by both the verifying and the owning party, but the hash value is preferably not the same as the corresponding document signature stored in the document register.

Herein, the terms "document" and "document version" are used. It is understood that a system and method according to the present invention may or may not allow document versioning, but if it does it is preferred that a particular document may exist in one or several document versions, for which the "document" in question is then always the same. It is further preferred that, in such case, each document has only one well-defined most recent (or only) document version in the document register. In FIGS. 2A-2E, these document versions correspond to different database posts or text lines in order of increasing registration time.

It is furthermore understood that the document register may store registration posts for several different documents, in which case the posts or lines appear in the document register in order of registration time, irrespective of to which document a particular document version pertains.

It is also understood that a "registration" of a document, as the term is used herein, may pertain to a particular document or to a document version of a particular document, as the case may be.

The digital document identifier ("Doc Id") illustrated in FIGS. 3A-3L, and which is preferably stored in the document register for each registered document or document version, is preferably at the most 16 bytes of length, and is preferably used to identify the document by and to interested parties, and in particular by and to the owning party in question and the central server 110. Preferably, it is this digital document identifier which is used to identify a particular document or document version when communicating over the interfaces 114, 115.

According to one preferred embodiment, the interface 115 is arranged to expose publicly all fields of the public document register. Also, at least one of the central servers 110, 120 is arranged to publish the updated document register in a public manner, such as on a publicly available web site, for document verification by interested third parties.

As mentioned above, the method according to the present invention may furthermore comprise the additional steps of amending the document in question, and thereafter performing the calculation of the digital document hash value based upon the document and the calculation of the digital document signature of the document, as described above, using the amended document. Hence, in this case, the "amended document" constitutes a new, subsequent, document version, registered as an additional post or line in the document register, with a new, unique, version number ("Doc ver") but the same document identifier ("Doc id") as for the previous version. As a result of said steps, a digital amended document hash value is produced, as well as a digital amended document signature, and the amended document signature as well as the public ownership key and the amended document hash value are digitally stored in the document register, as an additional document version, while the amended document as such is not stored in the document register.

This is illustrated in FIG. 2B, illustrating such an amended document, and in FIGS. 3B and 3C, showing the state of the document register after such addition.

In particular, it is preferred that the document to which the amendment pertains is associated with all amendments of the document in question in the document register, and that the information stored for the document and all amendments of the documents are retained in the document register when storing an additional amendment of the document in question. In the Figures, the association is embodied using the field "Doc ID".

In fact, FIGS. 2C, 3D, and 3E illustrate, in the corresponding way, another amendment to the document, of the type "TRA" for "transfer", or assignment, of the document in question to a different owning party. Furthermore, FIGS. 2D and 3F-3H also illustrate, correspondingly, an additional amendment, of the type "APP", which is performed by the said different owning party (the new document owner), while FIGS. 2E and 3I-3L illustrate yet another additional amendment, this time of the type "REV" for "revocation" or cancellation of the document in question. The "TRA" and "REV" types of amendments will be described in detail below.

In general, it is preferred that, for each document and document version (amendment), a respective time stamp is additionally stored in the document register, preferably being identical to a corresponding time stamp comprised in the amended document itself, at least for addition and ownership-change type amendments.

In particular, it is preferred that the time stamp in question comprises or is calculated based upon a time stamping signal value calculated based upon a publicly available information source and using a one-way function of the above defined type. Herein, a "publicly available information source" means a certain well-defined source of information which can be sampled, described or used as-is in order to produce a reference document describing a current state of the reference source. Examples of reference sources include the current quotes for certain predefined exchange-traded stock;

the current standing in a sports game; the currently viewed image frame in a publicly broadcast live television program or a currently broadcast audio signal in such program or a publicly broadcast live radio program; and the current front page of a newspaper published on the internet. It is then such a sampled reference document which is used to calculate the time stamping signal in question. The calculation of such a time stamping signal is described, for instance, in SE 1350947. Using such a time stamp makes it possible for verifying parties to verify that the document in question could impossibly have existed before a certain point in time at which a particular piece of information used to calculate the time stamping signal value in question appeared in said information source.

It is also preferred that the method further comprises a step, which is repeated for each registration of an additional document or document version, in which a digital register signature is calculated based upon the document register as such, and wherein this register signature is publicly published. The above described seal hash, in case it is calculated based upon the document register as such, is an example of such a register signature. That the signature is "publicly published" means that the signature is published in a digital publication channel in such a way so that it is readily available to a wide enough audience, and with sufficient persistence over time, so that a third party is likely to be able to verify the time of publication and the contents of the signature value exactly as it was at the date and time of publication, even if some time, such as several years, has passed after the publication. This makes it possible to verify, for any interested party, that the state of the document register at the time of calculation of the register signature at least existed at the time of publication of said register signature. Hence, using the time stamping signal as described above in combination with the public publication of the register signature, any party can verify, with high accuracy, the timing of a particular registered document or document version.

The time stamp may preferably contain the actual time in question, for clarity, or may be a piece of information unambiguously associated with a time stamp that may be accessible online and specifying the time in question.

Such a register signature may also be applied to blocks of document register updates or posts, so that the information contained in such a block is sealed using a signature which is publicly published and also added to the document register as such in a subsequent post or block, such as using an additional column corresponding to the columns shown in FIGS. 3A-3L.

To further increase security, the register signature may be calculated, using a suitable one-way function, also based upon a time-stamping signal of the above defined type. In particular, the digital register signature may be calculated additionally based upon a piece of public information which has been calculated based upon a publicly available source of information and using a one-way function.

As mentioned above, and in contrast to what is illustrated in FIGS. 2A-2E and 3A-3L, it is preferred that a new asymmetric ownership key pair is provided and used for each amended document, in other words for each registered document version. This increases security in relation to ownership status of documents that exist in several versions. It is noted that a document is preferably only considered "authentic" in its latest version. In other words, an additionally registered version of a document overrides all previous versions of that document, such that an owner of a previous version is not necessarily the owner of the document.

Another way of expressing this is that ownership in the sense of the present invention preferably is relevant on document level rather than on document version level.

Figure 6:
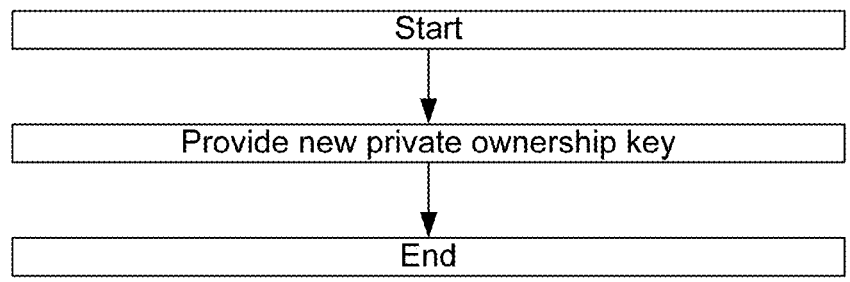
FIG. 6 is a flowchart showing a third method according to the invention.

FIGS. 2C and 3D-3E illustrate an amendment in the form of a document ownership change, to a different owning party, such as the party controlling computer 20. Such an ownership change method, which may form part of the registration method described above, is illustrated in FIG. 6. In a first step, the method starts.

Then, in an additional step, the new private ownership key is provided to the different owning party. This may, for instance, take place by the new owning party itself producing the private ownership key and storing it for future reference. Then, the new owning party may also produce a corresponding public ownership key, which is then added to the document register as a part of the added post or line, and possibly also to the amended document.

According to a preferred embodiment, an assignment transaction message is created and signed using the assigner's private ownership key, or is caused to comprise a signature, by the same key, of some other well-defined piece of information, and is communicated to the central server 110 from the assignor. The central server 110 may then verify the assignment transaction by verifying, using the previously stored public ownership key, that the assignor actually used the private ownership key to produce said signature, by a decrypting step of the signature using the corresponding public ownership key. Thereafter, if the signature verification turns out in the positive, the central server 110 stores the assignee's public ownership key for the document in question in the document register. The assignee's public ownership key may be comprised in said assignment transaction message, and may have been previously communicated from the assignee to the assignor.

Hence, the document shown in FIGS. 3D-3E is, again, a purely appended version of the document in its preceding version (2), shown in FIG. 2B. To the previous version of the document, the following information has been appended at the end:

The text "Content", heading the amendment payload information.
The text "Text: owner change", signalling to any interested party that this amendment is an ownership transfer-type amendment.
The new public ownership key ("Owner key"), calculated as described above, corresponding to the new private ownership key, which is not comprised in the document (corresponding to the above).
A new private version key ("Version key"), calculated as described above for version 3.
A new timestamp, of the above discussed type.
A new ledger signature (see below).

A new document signature may also be added (albeit not shown in FIG. 2C). The new document signature is calculated using the new public ownership key and at least the document payload, such as the entire version 3 of the document from its beginning up to, but not including, the signature itself. Note that FIGS. 2B-2D are marked with the words "Contents to hash" to delineate which parts of the document in question that are used for the calculation of the hash.

Correspondingly, FIGS. 3D-3E shows, in a fourth post or line with transaction identifier 3, the information added to the document register as result of the registration of the third version of the document, now with a new owner. The document identifier and the original hash stay the same, while the content hash, the document signature ("Owner signature"), ownership public key ("Owner key"), version public key ("Version key") and seal hash ("Ledger seal") are different between versions 2 and 3 of the document. It is noted that the new owner is not identified in the document register.

Since the new owner now controls the private ownership key corresponding to the public ownership key stored in the document register (and in the document itself in its version 3), the original owning party will not be able to provide a verifying signature as described above so as to prove legitimate ownership; however, the new owning party will be able to produce such a verifying signature.

In FIGS. 2D and 3F-3H, respectively, it is shown how the new document owner introduces an append to the document, hence creating a new, amended document version 4. As a result, the fields "Document hash", "Version key", "Owner signature", "Version signature", "Ledger signature" and "Ledger seal" are changed between transactions 3 and 5, whereas the "Owner key" stays the same (the document owner has not changed in this append operation).

FIGS. 2E and 3I-3L illustrate another type of document amendment which is registered in the document register, namely a document cancellation (transaction type "REV" for revocation). This amendment is similar to the "APP" and "TRA" amendments, in that a pure append is added to the document, at its end, with a "Content" text, as well as a new public ownership key, a new version key, a new timestamp and optionally (not shown in FIG. 2E) a new signature. However, after such a cancellation, no further document amendments are allowed by the central server 110.

Preferably, a public ownership key is recorded in the document register, under a cancelled version "5" of the document, which does not correspond to a valid private ownership key. In the example, the public key "00000000000000000000000000000000000000000000000000000000000000000000" is used. Preferably, this public key that does not correspond to a valid private ownership key is also stored in the document as such, which is illustrated in FIG. 2E. It may or may not be stored in the document register—in FIGS. 3I-3L the previous public ownership key is stored for reference, rather than the new one which is all zeroes.

Since no party claiming to be the owner of the document after the cancellation will be able to produce the verifying signature matching the now stored public ownership key, the document in fact belongs to no-one, and is therefore invalid or cancelled. It is noted that the cancellation transaction as such may be verified by any interested party by a query to the central server 110, via interface 115.

Figure 7:
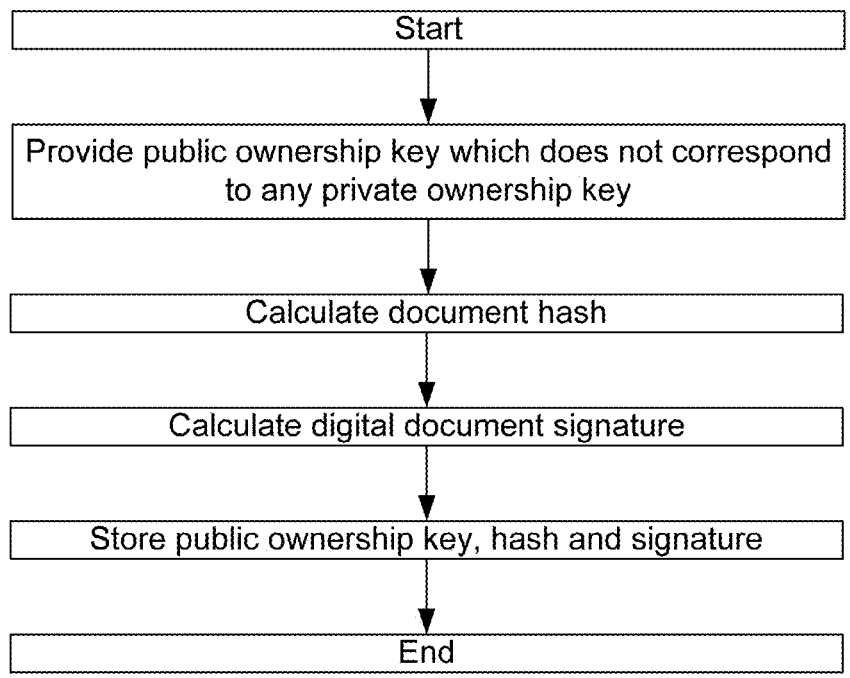
FIG. 7 is a flowchart showing a fourth method according to the invention.

FIG. 7 illustrates the cancellation steps that may be taken, possibly as a continuation of the method steps illustrated in FIG. 4. In a first step, the method starts. Then, the said invalid public ownership key is provided. The document hash is calculated, and a document signature is calculated in the way outlined above, based upon the document hash. Thereafter, the invalid public ownership key is stored, together with at least the said hash and signature, in the document register.

As described above, each document, in all its potential respective versions, is a respective plain text document. This has the advantage that the document is readily readable to humans, while still useful when being processed by the automated method using a system 100 of the type described herein. Preferably, all keys, signatures and hashes described herein that are stored in the document as such are preferably also written out in plain text. Examples of such plain text documents comprise normal .TXT text files, coded in Unicode format or any other suitable text format, in a way so that a hash of the document in question will be well-defined.

In particular, it is preferred that the document, in all its respective versions, comprises plain text information regarding a time stamp; the public ownership key; the document signature; and/or the document hash value, as described above. The document may also comprise information regarding the owning party identity.

As discussed above, it is preferred that the document hash value and the document signature are calculated based upon a part of the document not comprising neither the document hash value nor the document signature.

In general, it is preferred that the document, in all its respective versions, is formatted according to a predetermined plain text document formatting standard, in particular a standard which is unambiguously and deterministically parsable by a machine parser, for instance a software-implemented parsing algorithm, so that such a parser is able to automatically extract various predetermined information parts from the document in question, such as the public ownership key or the document payload.

In particular, it is preferred that the document formatting standard in question is a plain text format that does not require a document end tag. Suitable such formatting standards comprise the YML formatting standard, but not in general XML (since XML formatting requires an end tag). Since no end tag is required, document amendments can be produced by simple pure additions at the end of the document in question, as is illustrated in for instance FIGS. 2B-2D, without having to reformat the document in any other way, such as reformatting the previous parts of the document contained in a later version, to adhere to the formatting standard. This maintains full document integrity and trackability across different document versions.

One of the key aspects of the method and system according to the invention is that the document register does not comprise certain information. For instance, it is preferred that the document register does not comprise any information regarding the owning party to a particular document. In fact, the activity of the document register and the central server 110 is preferably kept to a minimum in relation to the document itself. For instance, the central server 110 preferably does not have access to any of the documents for which posts are stored in the document register, and preferably never changes the informational contents of such documents. This results in that the document register does not contain any information which can be used by a malevolent party which is neither the owner, nor has access to any copy of a registered document.

Furthermore, it is preferred that the central server 110 does no document format verification, but that the registering user is responsible for formatting the document in question according to the predetermined format described above, which may for instance be an YML format.

According to one preferred embodiment, a software function is provided by the system 100, such as by one or several of the central servers 110, 120, to user U computers 10, 20, 30. The software function may, for instance, be provided as a locally installable software application, a web service provided via a suitable interface, or similar, and is arranged to allow such computers 10, 20, 30 to automatically perform specific tasks in relation to the system 100 and using the predetermined document format specified by the system 100. For instance, the software application may be arranged to automatically construct a properly formatted document or document version, according to said predetermined document formatting standard, based upon document information comprising document payload information, a public ownership key and so forth; to automatically validate a document by reading its public ownership key and public version key and querying the central server 110, via interface 115, regarding the validity of the document in question, whether or not the document has been compromised, whether or not it is the latest version of the document, and so forth; and other automated document-specific tasks performed upon a manual command of a user U and/or upon an automatically produced command generated by a software-implemented algorithm. Preferably, the software application in question is provided by the system 100 and is automatically pushed or made available to all users of the system 100 when updated versions of the software application are available. This guarantees that all documents registered in the document register always have a formatting which is compliant for automatic processing by all users to the system 100. The source code of the software application may also be made publicly available, so that all users to the system 100 may incorporate the same source code in internal digital document-processing software systems, and so that the document-processing aspects in relation to the system 100, after compilation of said source code, is uniformly applied and compliant with the predetermined communication standards defined by the system 100.

In FIGS. 2A-2E, an "Url" is specified for the document. In this exemplifying case, the URL (Uniform Resource Locator) in question specifies an internet address which comprises the document identity, making the URL globally unique. In general, the document identity stored in the document register is unique among all documents registered in the document register. In the case with such a URL specified in the document, it is preferred that the URL actually specifies a web resource making available the document. This has the advantage of providing a unique address to the document, which is available for anyone with access to a copy of the actual digital document, which unique address will always make available information (such as versioning information, document lifecycle information or other metadata) pertaining to the most recent version of the document (since the document identity will not change between document versions), or possibly even to the document in question itself. Hence, upon a registered amendment, the central server 110, the owning party or any other suitable party, may update the contents reached by the said URL to reflect the most recently updated version of the document.

FIGS. 8A and 8B show a configuration document according to a preferred aspect of the present invention, in a document version "1" and a document version "2". The configuration document is preferably of the same type as the "normal" document illustrated in FIGS. 2A-2E and discussed above, and all that is said regarding the document illustrated in FIGS. 2A-2E is generally applicable also to the configuration document illustrated in FIGS. 8A-8B. In particular, it is preferred that the configuration document is used to tie a particular ledger or document register operator to the document register, preferably using a ledger key pair as described below. The configuration document, which is preferably a plaintext file, may also preferably be used to document other information regarding the document register, its features and mode of operation. If the configuration document is merely a "normal" document, added to the document register, amended and maintained therein in a way corresponding to any document, no additional infrastructure is required to handle document register ownership control and configuration. Also, the document register becomes self-contained, referencing only itself regarding these aspects.

In the example shown in FIGS. 8A-8B, the configuration information comprises contact information to the document register operator ("info@enigio.com"), as well as information regarding the maintainer and a master web site thereof. Preferably, each, or the latest update of the, configuration document is distributed together with the document register itself, and contains no secret information. It preferably versioned in the same manner as any other document register document.

FIGS. 3A-3L illustrate, in transactions "0" and "4", how the configuration document is registered in the document register. In transaction "0", the configuration document is first registered in a transaction denoted "COC" for "COnfiguration Create". Preferably, a first transaction in each document register is always a configuration document of the present type, so that any interested party may query the first transaction and there find reliable verifying information regarding a particular configuration document of the document register.

The configuration document furthermore comprises information regarding a party controlling the document register, preferably using the ledger key pair described below. In transaction "4", of type "COT" for "COnfiguration Transfer", the document register control is transferred from the party "Enigio Time AB", as specified by the first configuration document version (FIG. 8a) to "TimeBeat AB", as specified by the second configuration document version (FIG. 8b). This transfer is performed as "normal" document transfer, as described above in connection to transaction "3" for document "01c91cf9". As a result, the public ownership key changes in transaction "4", as compared to transaction "0", see FIGS. 8a and 8b.

As a result, a verifiable trace is stored, within the document register itself, of the party legitimately operating the document register. This way, it becomes difficult for a non-allowed party to take control over the ledger.

Furthermore, it is preferred that each post in the document register comprises a ledger signature, which is a signature calculated in a way corresponding to the above described signatures, using a private ledger key of a ledger key pair comprising the private ledger key and also a public ledger key. The ledger signature is preferably calculated based upon at least the previously registered post in the document register, such as based upon the information stored in said post itself.

Preferably, only the ledger operator authorized as the owner of the private ledger key may add new transactions to the ledger. This can be verified by any interested party by challenging a party adding a post to the document register to provide a signature of particular some piece of information using the private ledger key. Such a signature is then verifiable using the public ledger key, which is publicly available, such as from the most recent version of the configuration document. Ledger ownership may be historically verified using the ledger signature which is recorded in the document register for each post.

Furthermore, as is illustrated in FIGS. 2a-2e, the current public ledger key is enclosed, preferably in plain text, in each version of each document registered in the document register. In the present example, an updated public ledger key ("Ledger key") is only added to the document as the ledger key is updated. Then, the owner of each document may verify the legitimacy of the party operating the document register, and the whole system is therefore self-contained, only referencing itself.

Preferably, the ledger signature recorded in each document register is furthermore returned by the central server 110, via interface 114, in connection to every document operation, and is registered in the document register (column "Ledger signature") in the document register for each such operation. This way, the ledger signature can be used to verify the legitimacy of the party operating the document register after each document operation, using the ledger signature in combination with the available public ledger key.

If the private ledger key is lost, the party operating the document register can no longer add documents and document versions to the document register. This may lead to the document register being permanently locked for further document operations.

Document register control is preferably transferred by the new operator creating a new private/public ledger key pair, and registering an ownership transfer ("COT") document amendment to the configuration document. Preferably, the public ledger key is identical to the public ownership key for the configuration, and the private ledger key held by the document register operating party is identical to the private configuration document ownership key. Hence, by registering the configuration document transfer operation in the ledger, the same mechanism as for transfer of a "normal" document ownership is used for transfer of the whole document register, with the corresponding historic traceability being available to every interested party. Alternatively, the public ledger key may be registered as the public ownership key in the configuration document, in which case only one such public key needs to be published in the configuration document.

In a preferred embodiment, a document is only considered valid if it contains a valid (verifiable) current private document version key and a valid (verifiable) and current ledger signature.

In one preferred embodiment, all users to the system 100 are required to run a central server 110, in turn keeping a copy of the document register. Then, such users (such as banks) can allow sub-users (such as bank employees) access to the central server in question via the user's computers 10, 20. In this case, it is preferred that a transaction in the document register is not deemed complete without the user's central server 110 first receiving a complete copy of the most current document register, with the transaction in question, for local storing in the central server 110 in question. Preferably, the user's central server 110 may be in communication with another central server 120, such as a peer central server or a central super-server serving several central sub-servers, from which other central server 120 the copy of the most updated document register is received. The transaction may be deemed complete only when the receiving central server 110 provides the sending central server 120 with a hash of the complete received document register as a proof of the said reception of the updated copy of the document register.

In general, all key pairs used in the present invention are preferably 256 bits ECC, or higher security. No private keys are preferably ever transmitted between parties, central servers or any other entities.

In practise, all API 114, 115 calls from clients 10, 20 to the server 110 may be encrypted, such as using the above described public ledger key, for increased security.

FIG. 9 shows yet another exemplifying configuration document according to a preferred aspect of the present invention. The configuration document in FIG. 9 (see TYPE: AGREEMENT in initial payload) represents an agreement in which a hash in the initial payload points out the attached agreement text (probably a PDF document) that requires a number of signers and verifiers. The initial payload (the unamended payload) also states the necessary signers and verifiers for the agreement to be legally in force. As each signer and verifier performs their respective duty, an amendment is added for the respective signatures. The signers or verifiers also have the possibility to reject the agreement which makes it discarded.

In this example, firstly the document is registered with an initial payload. Prior to the payload it is specified the type of document this should be, and thus the mandatory fields and data needed for such an initial payload, in this case an "Agreement".

The payload, in this example, specifies a creator "Mats Stemgård" having an e-mail "mats@demo.se". The text that should be agreed upon and signed is referenced via a hash and a filename "ENIGIO_SPD_EARCHIVER.pdf". After this the creator has also stated the required signatures needed for this agreement to be legally in force; two signees and one verifier. The verifier Hans Almgren, signs that the agreement is OK and ready to sign by the signees from his view. Mats Stengård and Goran Almgren are required signees.

As each of the listed persons signs the document and amendment with their signature is added, as can be seen in the example. Each amendment payload contains the identity of the signee and the operation performed as well as the signature. All other required signatures from system and owner is also done to seal the Envelope for the amended document and each amendment. Each changed version is updated in the document register with the necessary hashes and signatures to make the new version a valid original. When all required signatures are done the agreement becomes a valid digital original.

Above, preferred embodiments have been described. However, it is apparent to the skilled person that many modifications can be made to the disclosed embodiments without departing from the basic idea of the invention.

For instance, many other types of digital documents may be registered and processed using a system and a method of the type described herein.

The document register may comprise additional fields for each registered document or document version than the ones shown in FIGS. 3a-3d.

Everything which is said herein about the method according to the present invention is equally applicable to the system according to the invention, and vice versa.

Hence, the invention is not limited to the described embodiments, but can be varied within the scope of the enclosed claims.

The invention claimed is:

1. A method for registering an electronically stored digital document, comprising the steps of:
   a) providing to an owning party an N version of the digital document and a private ownership key, which private ownership key is a private key in an asymmetric cryptographic key pair also comprising a corresponding public ownership key;
   b) calculating a first digital document hash value based upon a first payload of the N version of the digital document;
   c) the owning party using the private ownership key to calculate, based upon the first digital document hash value, a first digital document signature of the digital document;

d) in a centralized or distributed server function or database, digitally storing in an electronic digital document register not the N version of the digital document, but the first document signature as well as the public ownership key and the first document hash value;

e) amending the N version of the digital document by appending information to the N version of the digital document to produce a N+1 version of the digital document;

f) calculating a second digital document hash value based upon an appended payload of the N+1 version of the digital document as well as upon the first payload;

g) the owning party using the private ownership key to calculate, based upon the second digital document hash value, a second digital document signature of the N+1 version of the digital document; and h) in said electronic digital document register storing not the N+1 version of the digital document, but the second digital document signature and the second digital document hash value, as well as said public ownership key or a different public ownership key of a different asymmetric cryptographic key pair also comprising a different corresponding private ownership key.

2. The method according to claim 1, wherein step d) further comprises storing in the document register also a hash value of a first version of the digital document and a document version number of the digital document.

3. The method according to claim 1, wherein step d) further comprises storing in the document register also a unique transaction identifier.

4. The method according to claim 1, wherein step d) further comprises storing in the document register also a public version key, which public version key is a public key in an asymmetric cryptographic key pair also comprising a corresponding private version key, and in that the private version key is comprised in the digital document.

5. The method according to claim 4, wherein a current version of the digital document is not a first version, wherein the method further comprises a verification step in which the owning party is requested to produce a signature of a piece of verification information using a private version key comprised in a previous version of the digital document, and wherein step d) is not performed unless a public version key stored in the document register with respect to said previous version of the digital document matches the signature in question.

6. The method according to claim 1, further comprising the following steps:
i) the owning party using the private ownership key to calculate a digital verification signature of a piece of digital verifying information;
j) the owning party providing to a verifying party the verification signature;
k) using the public ownership key to verify both the verification signature and the document signature; and
l) in case the verifications in step g are positive, acknowledging the digital document.

7. The method according to claim 6, wherein the document register does not comprise information regarding the identity of the owning party, and in that step 11 is preceded by a step in which the verifying party electronically queries the owning party regarding ownership status of the digital document.

8. The method according to claim 6, wherein in a separate step it is verified that the owning party has access to the digital document by calculating a verification hash value based upon the digital document, using a hash function which is known by the verifying party, and the verifying party verifying the verification hash value.

9. The method according to claim 1, wherein the digital document is associated with all amendments of the digital document in the document register, and wherein the information stored for the digital document and all amendments of the versions of the digital document are retained in the document register when storing an additional amendment of the digital document.

10. The method according to claim 1, wherein for each version of the digital document, a respective time stamp is additionally stored in the document register.

11. The method according to claim 10, wherein the time stamp comprises or is calculated based upon a time stamping signal value calculated based upon a publicly available information source and using a one-way function.

12. The method according to claim 1, wherein the method further comprises a repeated step in which a digital register signature is calculated based upon the document register, and wherein the register signature is publicly published.

13. The method according to claim 12, wherein the digital register signature is calculated additionally based upon a piece of public information which is calculated based upon a publicly available source of information and using a one-way function.

14. The method according to claim 1, wherein a new asymmetric ownership key pair is provided and used for said amended digital document.

15. The method according to claim 14, wherein the digital document amendment is a change of document ownership to a different owning party, and wherein the method comprises the additional step of providing the new private ownership key to the different owning party.

16. The method according to claim 1, wherein the digital document amendment is a document cancellation, wherein no further document amendments are allowed after the document cancellation.

17. The method according to claim 1, wherein the digital document is a plain text document.

18. The method according to claim 17, wherein the digital document comprises information regarding the owning party identity; a time stamp; the public ownership key; the document signature; and/or the document hash value.

19. The method according to claim 17, wherein the digital document is formatted according to a predetermined plain text document formatting standard.

20. The method according to claim 19, wherein the document formatting standard does not require a document end tag.

21. A computer-implemented system for registering an electronically stored digital document, which system comprises one or more computer processors that execute a centralized or distributed server function arranged to:
upon receipt of a request from a computing device of a user, digitally store, in an electronic digital document register, not an N version of the digital document, but a first digital document signature as well as a public ownership key and a first digital document hash value, in that the public ownership key is a public key in an asymmetric cryptographic key pair also comprising a corresponding private ownership key, in that the first hash value is calculated based upon a first payload of the N version of the digital document, and in that the first document signature is calculated based upon the first hash value and using the private ownership key;
store, in the electronic digital document register, not a N+1 version of the digital document, the N+1 version being an amended version of the N version of the digital document produced by appending information to the N version of the digital document to produce the N+1 version of the digital document, but a second digital document signature as well as said public ownership key, or a different public ownership key of a different asymmetric cryptographic key pair also comprising a different corresponding private ownership key, and a second digital document hash value, in that the second hash value is calculated based upon an appended payload of the N+1 version of the digital document as well as upon said first payload, and in that the second document signature is calculated based upon the second digital document hash value.

* * * * *